(12) United States Patent
Berkley et al.

(10) Patent No.: US 9,015,215 B2
(45) Date of Patent: Apr. 21, 2015

(54) SYSTEMS, METHODS, AND APPARATUS FOR CALIBRATING, CONTROLLING, AND OPERATING A QUANTUM PROCESSOR

(75) Inventors: Andrew J. Berkley, Vancouver (CA); Richard G. Harris, North Vancouver (CA); Mohammad Amin, Vancouver (CA)

(73) Assignee: D-Wave Systems, Inc., Burnaby (CA)

( * ) Notice: Subject to any disclaimer, the term of this patent is extended or adjusted under 35 U.S.C. 154(b) by 1199 days.

(21) Appl. No.: 12/991,888

(22) PCT Filed: May 19, 2009

(86) PCT No.: PCT/US2009/044537
§ 371 (c)(1),
(2), (4) Date: Nov. 9, 2010

(87) PCT Pub. No.: WO2009/143166
PCT Pub. Date: Nov. 26, 2009

(65) Prior Publication Data
US 2011/0060780 A1    Mar. 10, 2011

Related U.S. Application Data

(60) Provisional application No. 61/100,582, filed on Sep. 26, 2008, provisional application No. 61/094,002, filed on Sep. 3, 2008, provisional application No. 61/092,665, filed on Aug. 28, 2008, provisional application No. 61/054,740, filed on May 20, 2008.

(51) Int. Cl.
*G06F 15/00*       (2006.01)
*B82Y 10/00*       (2011.01)
*G06N 99/00*       (2010.01)

(52) U.S. Cl.
CPC .............. *B82Y 10/00* (2013.01); *G06N 99/002* (2013.01); *Y10S 505/846* (2013.01)

(58) Field of Classification Search
None
See application file for complete search history.

(56) References Cited

U.S. PATENT DOCUMENTS

| | | | |
|---|---|---|---|
| 7,135,701 B2 | 11/2006 | Amin et al. | 257/31 |
| 7,843,209 B2 | 11/2010 | Berkley | 326/7 |

(Continued)

FOREIGN PATENT DOCUMENTS

| | | |
|---|---|---|
| WO | 2009/120638 | 10/2009 |

OTHER PUBLICATIONS

Harris et al., "Sign and Magnitude Tunable Coupler for Superconducting Flux Qubits," arXiv:cond-mat/0608253 v1, 5 pages, Aug. 11, 2006.

(Continued)

*Primary Examiner* — Michael D Yaary
(74) *Attorney, Agent, or Firm* — Seed IP Law Group PLLC

(57) ABSTRACT

Quantum annealing may include applying and gradually removing disorder terms to qubits of a quantum processor, for example superconducting flux qubits of a superconducting quantum processor. A problem Hamiltonian may be established by applying control signals to the qubits, an evolution Hamiltonian established by applying disorder terms, and annealing by gradually removing the disorder terms. Change in persistent current in the qubits may be compensated. Multipliers may mediate coupling between various qubits and a global signal line, for example by applying respective scaling factors. Two global signal lines may be arranged in an inter-digitated pattern to couple to respective qubits of a communicatively coupled pair of qubits. Pairs of qubits may be communicatively isolated and used to measure a response of one another to defined signals.

37 Claims, 10 Drawing Sheets

(56) References Cited

U.S. PATENT DOCUMENTS

| | | | |
|---|---|---|---|
| 2006/0147154 A1 | 7/2006 | Thom et al. | 385/37 |
| 2006/0151775 A1* | 7/2006 | Hollenberg et al. | 257/14 |
| 2006/0225165 A1 | 10/2006 | Maassen van den Brink et al. | 977/933 |
| 2006/0248618 A1 | 11/2006 | Berkley | 977/700 |
| 2007/0080341 A1* | 4/2007 | Macready et al. | 257/31 |
| 2007/0174227 A1 | 7/2007 | Johnson et al. | 706/62 |
| 2007/0180586 A1 | 8/2007 | Amin | 977/755 |
| 2007/0239366 A1* | 10/2007 | Hilton et al. | 702/27 |
| 2008/0176750 A1 | 7/2008 | Rose et al. | 505/170 |
| 2008/0215850 A1 | 9/2008 | Berkley et al. | 712/1 |
| 2008/0238531 A1 | 10/2008 | Harris | 327/528 |
| 2008/0274898 A1 | 11/2008 | Johnson et al. | 505/190 |
| 2009/0078931 A1 | 3/2009 | Berkley | 257/31 |
| 2009/0082209 A1 | 3/2009 | Bunyk et al. | 505/190 |
| 2009/0121215 A1 | 5/2009 | Choi | 257/31 |

OTHER PUBLICATIONS

Maassen van den Brink et al., "Mediated tunable coupling of flux qubits," *New Journal of Physics* 7:1-18, 2005.

Harris et al., "A Compound Josephson Junction Coupler for Flux Qubits with Minimal Crosstalk," arXiv:0904.3784 v1, 4 pages, Apr. 24, 2009.

Harris, "Systems, Methods, and Apparatus for Controlled Quantum Annealing Towards a Target Hamiltonian," U.S. Appl. No. 61/054,740, filed May 20, 2008, 31 pages.

Maibaum et al., Systems, Methods and Apparatus for Superconducting Demultiplexer Circuits, U.S. Appl. No. 61/058,494, filed Jun. 3, 2008, 66 pages.

Amin et al., "Systems, Methods and Apparatus to Avoid Local Minima in Quantum Computation," U.S. Appl. No. 61/092,665, filed Aug. 28, 2008, 32 pages.

Harris et al., "Systems, Methods and Apparatus for Active Compensation of Quantum Processor Elements," U.S. Appl. No. 61/094,002, filed Sep. 3, 2008, 58 pages.

Harris et al., "Systems, Methods and Apparatus for Calibrating the Elements of a Quantum Processor," U.S. Appl. No. 61/100,582, filed Sep. 26, 2008, 40 pages.

Rose et al., "An Introduction to Quantum Annealing," DWAVE/Technical Document 0712, D-Wave Systems Inc., Burnaby, British Columbia, Canada, Aug. 10, 2007, pp. 1-3.

International Search Report, mailed Jan. 4, 2010, for PCT/US2009/044537, 3 pages.

Written Opinion, mailed Jan. 4, 2010, for PCT/US2009/044537, 5 pages.

Burton, Jr. et al., "Event-Dependent Control of Noise Enhances Learning in Neural Networks," *Neural Networks*, vol. 5, pp. 627-637, 1992.

Maryak et al., "Efficient Global Optimization Using SPSA," *Proceedings of the American Control Conference*, pp. 890-894, 1999.

Ruján, "Searching for Optimal Configurations by Simulated Tunneling," *Condensed Matter*, pp. 391-416, 1988.

* cited by examiner

SYSTEMS, METHODS, AND APPARATUS FOR CALIBRATING, CONTROLLING, AND OPERATING A QUANTUM PROCESSOR

CROSS REFERENCE TO RELATED APPLICATIONS

This application is a U.S. national stage application filed under 35 U.S.C. §371 of International Patent Application PCT/US2009/044537, accorded an international filing date of May 19, 2009 which claims benefit under 35 U.S.C. 119(e) of U.S. Provisional Patent Application Ser. No. 61/054,740, filed May 20, 2008 and entitled "Systems, Methods and Apparatus for Controlled Quantum Annealing Towards a Target Hamiltonian"; U.S. Provisional Patent Application Ser. No. 61/092,665, filed Aug. 28, 2008 and entitled "Systems, Methods and Apparatus to Avoid Local Minima in Quantum Computation"; U.S. Provisional Patent Application Ser. No. 61/094,002, filed Sep. 3, 2008 and entitled "Systems, Methods and Apparatus for Active Compensation of Quantum Processor Elements"; and U.S. Provisional Patent Application Ser. No. 61/100,582, filed Sep. 26, 2008 and entitled "Systems, Methods and Apparatus for Calibrating the Elements of a Quantum Processor," all of which are incorporated herein by reference in their entirety.

BACKGROUND

Field

The present systems, methods and apparatus generally relate to quantum computation and specifically relate to superconducting quantum computation and implementations of quantum annealing.

Superconducting Qubits

There are many different hardware and software approaches under consideration for use in quantum computers. One hardware approach employs integrated circuits formed of superconducting material, such as aluminum and/or niobium, to define superconducting qubits. Superconducting qubits can be separated into several categories depending on the physical property used to encode information. For example, they may be separated into charge, flux and phase devices. Charge devices store and manipulate information in the charge states of the device; flux devices store and manipulate information in a variable related to the magnetic flux through some part of the device; and phase devices store and manipulate information in a variable related to the difference in superconducting phase between two regions of the phase device.

Many different forms of superconducting flux qubits have been implemented in the art, but all successful implementations generally include a superconducting loop (i.e., a "qubit loop") that is interrupted by at least one Josephson junction. Some embodiments implement multiple Josephson junctions connected either in series or in parallel (i.e., a compound Josephson junction) and some embodiments implement multiple superconducting loops.

Persistent Current

As previously discussed, a superconducting flux qubit may comprise a qubit loop that is interrupted by at least one Josephson junction, or at least one compound Josephson junction. Since a qubit loop is superconducting, it effectively has no electrical resistance. Thus, electrical current traveling in a qubit loop may experience no dissipation. If an electrical current is induced in the qubit loop by, for example, a magnetic flux signal, this current may be sustained indefinitely. The current may persist indefinitely until it is interfered with in some way or until the qubit loop is no longer superconducting (due to, for example, heating the qubit loop above its critical temperature). For the purposes of this specification, the term "persistent current" is used to describe an electrical current circulating in a qubit loop of a superconducting qubit. The sign and magnitude of a persistent current may be influenced by a variety of factors, including but not limited to a flux signal $\phi_X$ coupled directly into the qubit loop and a flux signal $\phi_{CJJ}$ coupled into a compound Josephson junction that interrupts the qubit loop.

Quantum Processor

A computer processor may take the form of an analog processor, for instance a quantum processor such as a superconducting quantum processor. A superconducting quantum processor may include a number of qubits and associated local bias devices, for instance two or more superconducting qubits. Further detail and embodiments of exemplary quantum processors that may be used in conjunction with the present systems, methods, and apparatus are described in US Patent Publication No. 2006-0225165, US Patent Publication 2008-0176750, U.S. patent application Ser. No. 12/266,378, and PCT Patent Application Serial No. PCT/US09/37984.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can be excited to a higher energy state, such as the first excited state. In the present systems, methods, and apparatus, an "adiabatic" evolution is considered to be an evolution that satisfies the adiabatic condition:

$$\dot{s}\langle 1|dH_e/ds|0\rangle = \delta g^2(s)$$

where $\dot{s}$ is the time derivative of s, g(s) is the difference in energy between the ground state and first excited state of the system (also referred to herein as the "gap size") as a function of s, and δ is a coefficient much less than 1.

The evolution process in adiabatic quantum computing may sometimes be referred to as annealing. The rate that s changes, sometimes referred to as an evolution or annealing schedule, is normally slow enough that the system is always in the instantaneous ground state of the evolution Hamiltonian during the evolution, and transitions at anti-crossings (i.e., when the gap size is smallest) are avoided. Further details on adiabatic quantum computing systems, methods, and apparatus are described in U.S. Pat. No. 7,135,701.

Quantum Annealing

Quantum annealing is a computation method that may be used to find a low-energy state, typically preferably the ground state, of a system. Similar in concept to classical annealing, the method relies on the underlying principle that natural systems tend towards lower energy states because lower energy states are more stable. However, while classical annealing uses classical thermal fluctuations to guide a system to its global energy minimum, quantum annealing may use quantum effects, such as quantum tunneling, to reach a global energy minimum more accurately and/or more quickly. It is known that the solution to a hard problem, such as a combinatorial optimization problem, may be encoded in the ground state of a system Hamiltonian and therefore quantum annealing may be used to find the solution to such hard problems. Adiabatic quantum computation is a special case of quantum annealing for which the system, ideally, begins and remains in its ground state throughout an adiabatic evolution. Thus, those of skill in the art will appreciate that quantum annealing systems and methods may generally be implemented on an adiabatic quantum computer, and vice versa. Throughout this specification and the appended claims, any reference to quantum annealing is intended to encompass adiabatic quantum computation unless the context requires otherwise.

Quantum annealing is an algorithm that uses quantum mechanics as a source of disorder during the annealing process. The optimization problem is encoded in a Hamiltonian $H_P$, and the algorithm introduces strong quantum fluctuations by adding a disordering Hamiltonian $H_D$ that does not commute with $H_P$. An example case is:

$$H_E = H_P + \Gamma H_D,$$

where $\Gamma$ changes from a large value to substantially zero during the evolution and $H_E$ may be thought of as an evolution Hamiltonian similar to $H_e$ described in the context of adiabatic quantum computation above. The disorder is slowly removed by removing $H_D$ (i.e., reducing $\Gamma$). Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in a local minimum close to the exact solution; the slower the evolution, the better the solution that will be achieved. The performance of the computation may be assessed via the residual energy (distance from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of $\Gamma$ in quantum annealing may follow a defined schedule known as an annealing schedule. Unlike traditional forms of adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem.

Fixed Quantum Annealing with a Superconducting Quantum Processor

A straightforward approach to quantum annealing with superconducting flux qubits uses fixed flux biases applied to the qubit loops ($\phi_X$) and qubit couplers ($\phi_J$). The motivation of this scheme is to define the problem Hamiltonian $H_P$ by these fixed flux biases, which generally remain static throughout the annealing process. The disorder term $\Gamma H_D$ may be realized by, for example, coupling a respective flux signal $\phi_{CJJ}$ into the compound Josephson junction of each $i^{th}$ qubit to realize single qubit tunnel splitting $\Delta_i$. In the annealing procedure, the $\phi_{CJJ}$ signals are initially applied to induce maximum disorder in each qubit and then gradually varied such that only $H_P$, as defined by the static flux biases, remains at the end of the evolution. This approach, referred to herein as "fixed quantum annealing" because the signals applied to the qubit loops remain substantially fixed, is attractive due to its simplicity: the only time varying signals are applied to the qubit compound Josephson junctions in order to modulate the tunnel splitting $\Delta$. However, this approach does not account for an important effect: qubit persistent currents are also a function of the flux signal $\phi_{CJJ}$ applied to the compound Josephson junction of each qubit. This means that the carefully crafted terms of the problem Hamiltonian $H_P$ that are intended to be defined by the static flux biases applied to the qubit loops ($\phi_X$) and qubit couplers ($\phi_J$) are actually influenced by the gradual reduction of the $\phi_{CJJ}$ signals in the annealing process. Simply applying fixed flux biases ($\phi_X$ and $\phi_J$) does not address this issue. The fact that the qubit persistent currents evolve during the annealing process may affect the whole evolution path of the system.

The ultimate goal of quantum annealing is to find a low-energy state, typically preferably the ground state, of a system Hamiltonian. The specific system Hamiltonian for which the low-energy state is sought is the problem Hamiltonian $H_P$ which is characterized, at least in part, by the persistent currents circulating in each respective qubit. In quantum annealing the problem Hamiltonian $H_P$ is typically configured right from the beginning. The annealing procedure then involves applying a disorder term $\Gamma H_D$ (which realizes the tunnel splitting $\Delta$) that effectively smears the state of the system, and then gradually removing this disorder term such that the system ultimately stabilizes in a low-energy state (such as the ground state) of the problem Hamiltonian $H_P$. In the fixed quantum annealing approach, the terms of $H_P$ are statically applied throughout the annealing process and the only time-varying signals are the $\phi_{CJJ}$ signals that realize the disorder term $\Gamma H_D$. However, because the qubit persistent currents are ultimately influenced by the application and gradual removal of the $\phi_{CJJ}$ signals, the energy landscape of the problem Hamiltonian $H_P$ varies throughout the annealing procedure. This means that while the annealing procedure seeks a low-energy state of $H_P$, the problem Hamiltonian $H_P$ itself evolves and so too does the location of the desired low-energy state (e.g., ground state). Furthermore, the "gradual removal" of the disorder term $\Gamma H_D$ is typically physically achieved by a series of downward steps as opposed to a continuous ramping. Because the persistent current in the qubits changes in response to each downward step, the system may effectively anneal towards a different state at each step. Thus, fixed quantum annealing with superconducting flux qubits can be problematic because it relies on a discontinuous evolution towards a moving target. As such, there is a need in the art for a more reliable and accurate protocol for quantum annealing with superconducting flux qubits.

BRIEF SUMMARY

A variety of systems, methods and apparatus that enable calibration, control, and operation of a quantum processor are described.

At least one embodiment may be summarized as a method of quantum annealing using a superconducting quantum processor comprising superconducting flux qubits, the method including applying a flux bias to each qubit, thereby at least partially defining a problem Hamiltonian; applying a disorder term to each qubit, thereby at least partially defining an evolution Hamiltonian; gradually removing the disorder term applied to each qubit, thereby inducing a change in a persistent current in each qubit; compensating for the change in the persistent current in each qubit by dynamically varying the flux bias applied to each qubit; and measuring a state of at least one qubit in the quantum processor. Gradually removing the disorder term applied to each qubit may include gradually removing the disorder term according to a time-varying annealing waveform. Compensating for the change in the persistent current in each qubit may include adjusting the flux bias applied to each qubit according to a time-varying compensation waveform. The annealing waveform and the compensation waveform may be substantially synchronized. In some embodiments, compensating for the change in the persistent current in each qubit may include maintaining a substantially constant ratio in the evolution Hamiltonian. Applying a flux bias to each qubit may at least partially define a problem Hamiltonian that includes a 2-local Ising Hamiltonian substantially described by:

$$H_P = \sum_{i=1}^{n} h_i \sigma_i^z + \sum_{i,j=1}^{n} J_{ij} \sigma_i^z \sigma_j^z$$

and compensating for the change in the persistent current in each qubit may include maintaining a substantially constant ratio of $h_i:J_{ij}$ in the problem Hamiltonian.

At least one embodiment may be summarized as a method of quantum annealing using a quantum processor comprising a set of qubits, the method including establishing a problem Hamiltonian by applying at least one control signal to each qubit; establishing an evolution Hamiltonian by applying at least one disordering signal to each qubit; annealing towards a target Hamiltonian by gradually removing the disordering signals from each qubit; and maintaining a substantially fixed dimensionless target Hamiltonian by adjusting the at least one control signal applied to each qubit during the annealing. Annealing towards a target Hamiltonian may include annealing towards the target Hamiltonian that is substantially similar to the problem Hamiltonian. In some embodiments, the method may include extracting a scalar prefactor from the problem Hamiltonian and maintaining a substantially fixed dimensionless target Hamiltonian may include adjusting the at least one control signal applied to each qubit such that a ratio between the at least one control signal applied to each qubit and the scalar prefactor is substantially constant during the annealing. In some embodiments, applying a control signal to each qubit may include applying the control signal to each of a number of qubits in a superconducting quantum processor.

At least one embodiment may be summarized as a qubit control system including a first qubit; a second qubit; a first multiplier, wherein the first multiplier is configured to communicably couple to the first qubit; a second multiplier, wherein the second multiplier is configured to communicably couple to the second qubit; and a global signal line, wherein the global signal line is configured to communicably couple to both the first multiplier and the second multiplier such that the first multiplier mediates a coupling between the global signal line and the first qubit and the second multiplier mediates a coupling between the global signal line and the second qubit. The first multiplier may be tunable to provide a first scaling factor to a dynamic signal carried by the global signal line, and the second multiplier may be tunable to provide a second scaling factor to the dynamic signal carried by the global signal line. In some embodiments, the qubit control system may include a first programming interface that is configured to communicably couple to the first multiplier, wherein a controllable signal from the first programming interface operates to tune the first scaling factor of the first multiplier; and a second programming interface that is configured to communicably couple to the second multiplier, wherein a controllable signal from the second programming interface operates to tune the second scaling factor of the second multiplier. The first programming interface may include a first digital-to-analog converter and the second programming interface may include a second digital-to-analog converter. The first qubit may be a superconducting flux qubit comprising a qubit loop and a compound Josephson junction, and the second qubit may be a superconducting flux qubit comprising a qubit loop and a compound Josephson junction. The first multiplier may be a superconducting coupler comprising a loop of superconducting material interrupted by a compound Josephson junction with the first programming interface being configured to communicably couple to the compound Josephson junction of the first multiplier, and the second multiplier may be a superconducting coupler comprising a loop of superconducting material interrupted by a compound Josephson junction with the second programming interface being configured to communicably couple to the compound Josephson junction of the second multiplier. In some embodiments, the first multiplier may be configured to communicably couple to the qubit loop of the first qubit and the second multiplier may be configured to communicably couple to the qubit loop of the second qubit. In other embodiments, the first multiplier may be configured to communicably couple to the compound Josephson junction of the first qubit and the second multiplier may be configured to communicably couple to the compound Josephson junction of the second qubit. The first programming interface may include a first superconducting digital-to-analog converter and the second programming interface may include a second superconducting digital-to-analog converter.

At least one embodiment may be summarized as a method of applying a dynamic signal to at least two devices in a quantum processor, the method including programming a first multiplier to apply a first scaling factor to the dynamic signal in order to accommodate the behavior of a first device in the quantum processor; programming a second multiplier to apply a second scaling factor to the dynamic signal in order to accommodate the behavior of a second device in the quantum processor; transmitting the dynamic signal through a global signal line; configuring the first multiplier to communicably couple the global signal line to the first device in the quantum processor such that the first multiplier couples a first signal to the first device in the quantum processor, wherein the first signal is the dynamic signal scaled by the first scaling factor; and simultaneously configuring the second multiplier to communicably couple the global signal line to the second device in the quantum processor such that the second multiplier couples a second signal to the second device in the quantum processor, wherein the second signal is the dynamic signal scaled by the second scaling factor. The first device may be a first superconducting flux qubit and the second device may be a second superconducting flux qubit.

At least one embodiment may be summarized as a quantum processor including a plurality of qubits arranged in an inter-coupled network such that each qubit is configured to communicably couple to at least one other qubit in the inter-coupled network; and at least two global signal lines, wherein each qubit is configured to communicably couple to one of the global signal lines and wherein the at least two global signal lines are arranged in an interdigitated pattern such that any two qubits that are configured to communicably couple together are each configured to communicably couple to a different one of the global signal lines. The at least two global signal lines may both be annealing signal lines that are configured to carry annealing signals to evolve the quantum processor during one of an adiabatic quantum computation and a quantum annealing computation. In some embodiments, each qubit in the plurality of qubits may be a superconducting flux qubit comprising a compound Josephson junction, and the compound Josephson junction of each qubit may be configured to communicably couple to one of the annealing signal lines. In other embodiments, each qubit in the plurality of qubits may be a superconducting qubit comprising a qubit loop, wherein each qubit loop is formed by a respective loop of superconducting material, and the qubit loop of each qubit may be configured to communicably couple to one of the global signal lines. The communicable coupling between any two qubits that are configured to communicably couple together may be achieved through a respective coupling device, and at least two additional global signal lines may be included such that any two coupling devices that are configured to communicably couple to the same qubit are each separately controlled by a respective one of the at least two additional global signal lines.

At least one embodiment may be summarized as a quantum processor including a plurality of qubits; a plurality of couplers arranged to selectively communicably couple respective pairs of the qubits in an inter-coupled network such that each qubit is configured to communicably couple to at least one other qubit in the inter-coupled network; and at least two global signal lines including interfaces selectively operable to couple signals to respective ones of pairs of the qubits wherein any two qubits that are configured to communicably couple together by a respective coupler are each configured to communicably couple to a different one of the global signal lines. The interfaces may be inductive coupling structures. Some embodiments may also include a set of global coupler control lines, wherein any two couplers that are configured to communicably couple to the same qubit are each configured to communicably couple to a different one of the global coupler control lines.

At least one embodiment may be summarized as a method of calibrating a qubit in a quantum processor comprising a plurality of qubits arranged in an inter-coupled network, the method including communicatively isolating a pair of coupled qubits from the other qubits in the quantum processor by deactivating any couplings between the pair of qubits and the other qubits in the quantum processor, wherein the pair of qubits comprises a first qubit and a second qubit; applying a first signal to the first qubit in the pair of coupled qubits; and measuring with the second qubit in the pair of coupled qubits a behavior of the first qubit in response to the first signal. The first qubit may be operated as a source qubit and the second qubit may be operated as a sensor qubit. In some embodiments, the method may also include applying a second signal to the second qubit in the pair of coupled qubits; and measuring with the first qubit in the pair of coupled qubits a behavior of the second qubit in response to the second signal.

At least one embodiment may be summarized as a superconducting quantum processor including a plurality of qubits; a plurality of couplers configured to provide communicable coupling between at least some respective pairs of qubits; a first set of programming interfaces operable to apply a flux bias to each qubit; a second set of programming interfaces operable to apply a dynamic annealing signal to each qubit; and a third set of programming interfaces operable to apply a dynamic compensation signal to each qubit, wherein each programming interface in the third set of programming interfaces includes a respective multiplier, and wherein each respective multiplier is configured to mediate a communicable coupling between a global signal line and a respective qubit.

At least one embodiment may be summarized as a superconducting quantum processor including a plurality of qubits; a plurality of couplers configured to provide communicable coupling between at least some respective pairs of qubits; and a set of programming interfaces configured to: establish a problem Hamiltonian by applying at least one control signal to each qubit; establish an evolution Hamiltonian by applying at least one disordering signal to each qubit; anneal towards a target Hamiltonian by gradually removing the disordering signals from each qubit; and maintain a substantially fixed dimensionless target Hamiltonian by adjusting the at least one control signal applied to each qubit during the annealing.

At least one embodiment may be summarized as a quantum processor including a first qubit; a first programming interface configured to apply a first signal to the first qubit; and a second qubit configured to measure a behavior of the first qubit in response to the first signal.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
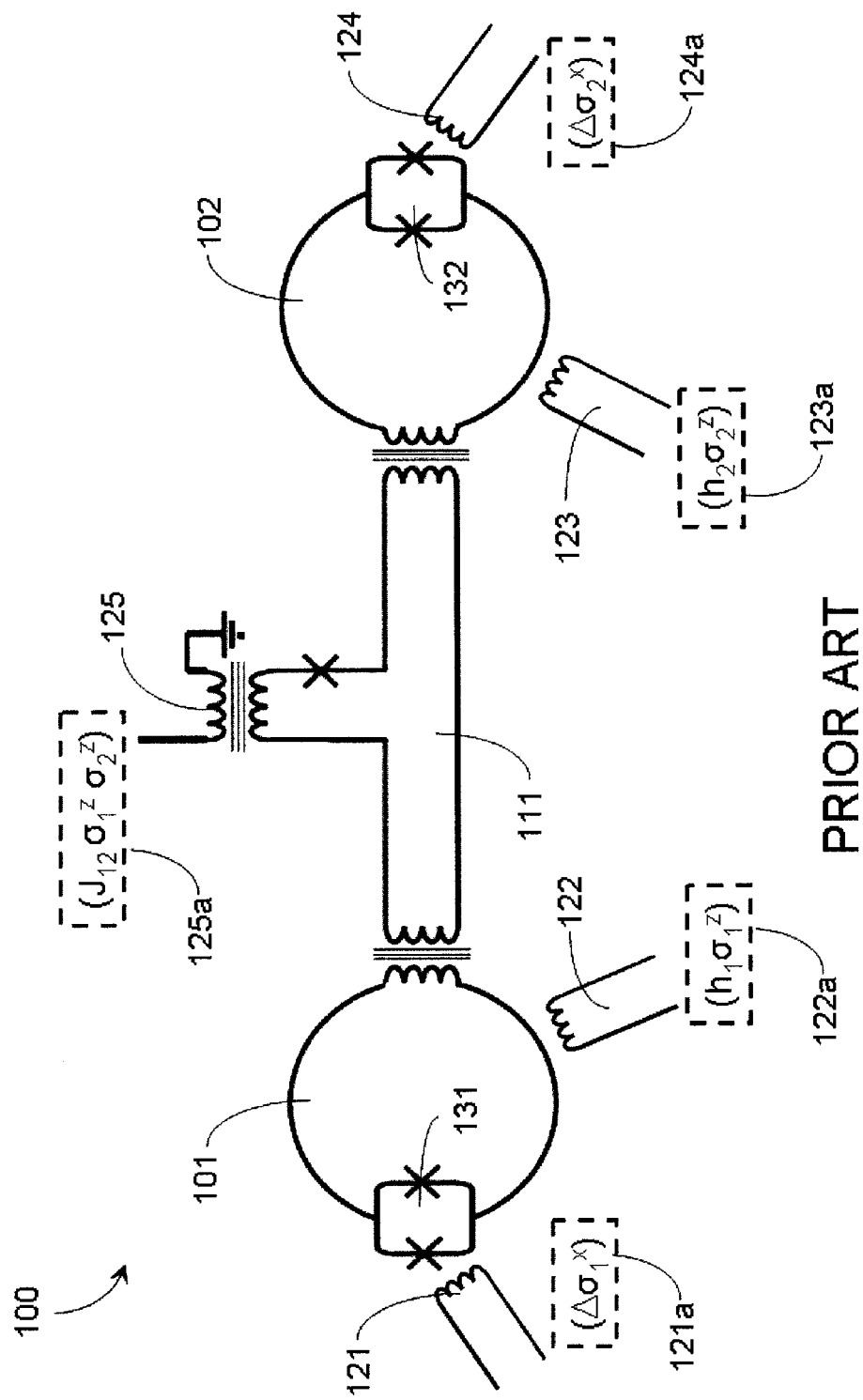
FIG. 1 is a schematic diagram of a portion of a conventional superconducting quantum processor designed for quantum annealing (and/or adiabatic quantum computation).

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors and drive circuitry have not been shown or described in detail to avoid unnecessarily obscuring descriptions of the embodiments of the present systems, methods and apparatus. Throughout this specification and the appended claims, the words "element" and "elements" are used to encompass, but are not limited to, all such structures, systems and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

In accordance with the present systems, methods and apparatus, a new protocol or process for quantum annealing is described. This form of quantum annealing is referred to herein as "controlled quantum annealing" and is particularly well-suited to be implemented using a quantum processor comprising superconducting flux qubits. Those of skill in the art will appreciate, however, that the concepts embodied in controlled quantum annealing may be applied to other forms of quantum processors implementing other forms of qubits.

Quantum annealing may be implemented in a variety of different ways, but the end goal is generally the same: find a low-energy state, such as a ground state, of a system Hamiltonian where the system Hamiltonian encodes a computational problem and the low-energy state represents a solution to the computational problem. The system Hamiltonian may therefore be referred to as a "problem Hamiltonian." The exact form of the problem Hamiltonian may vary depending on the hardware upon which it is being implemented. As an example, a quantum processor comprising superconducting flux qubits may be used to embody a problem Hamiltonian substantially in the form of a 2-local Ising Hamiltonian given in equation 1:

$$H_P = \sum_{i=1}^{n} h_i \sigma_i^z + \sum_{i,j=1}^{n} J_{ij} \sigma_i^z \sigma_j^z \tag{1}$$

Here, n represents the number of qubits, $\sigma_i^z$ is the Pauli Z-matrix for the $i^{th}$ qubit, and $h_i$ and $J_{ij}$ are dimensionless local fields coupled to each qubit. The $h_i$ terms in equation 1 may be physically realized by respectively coupling flux signals $\phi_X$ to the qubit loop of each $i^{th}$ qubit. The $J_{ij}$ terms in equation 1 may be physically realized by respectively coupling the qubit loops of pairs of qubits (qubits i and j, respectively) together with a coupling strength that is at least partially governed by an applied coupler flux bias $\phi_J$. Determining a low-energy state, such as a ground state, of the 2-local Ising Hamiltonian in equation 1 is known to be computationally difficult. Other problems may be mapped to the 2-local Ising Hamiltonian; thus, this Hamiltonian may be cast as the general problem Hamiltonian in a quantum processor that implements quantum annealing. To anneal the Hamiltonian described by equation 1, a disorder term may be added as previously described, thereby realizing an evolution Hamiltonian given by equation 2:

$$H_E = \sum_{i=1}^{n} h_i \sigma_i^z + \sum_{i,j=1}^{n} J_{ij} \sigma_i^z \sigma_j^z + \sum_{i=1}^{n} \Delta_i \sigma_i^x, \tag{2}$$

where $\sigma_i^x$ is the Pauli X-matrix for the $i^{th}$ qubit and $\Delta_i$ is the single qubit tunnel splitting induced in the $i^{th}$ qubit. During annealing, the tunnel splitting $\Delta_i$ is gradually removed until only the problem Hamiltonian given by equation 1 remains. A brief description of how fixed quantum annealing of the 2-local Ising Hamiltonian may be realized using a quantum processor comprising superconducting flux qubits is now provided.

FIG. 1 is a schematic diagram of a portion of a conventional superconducting quantum processor 100 designed for fixed quantum annealing (and/or adiabatic quantum computation). The portion of superconducting quantum processor 100 shown in FIG. 1 includes two superconducting flux qubits 101, 102 and a tunable ZZ-coupler 111 coupling information therebetween. While the portion of quantum processor 100 shown in FIG. 1 includes only two qubits 101, 102 and one coupler 111, those of skill in the art will appreciate that the full quantum processor 100 may include any number of qubits, and any number of coupling devices coupling information therebetween.

The portion of quantum processor 100 shown in FIG. 1 may be implemented to physically realize the Hamiltonians described by equation 1 and equation 2. In order to provide the $\sigma^z$ and $\sigma^x$ terms in these Hamiltonians, quantum processor 100 includes programming interfaces 121-125 that are used to configure and control the state of quantum processor 100. Throughout this specification and the appended claims, the term "programming interface" is used to refer to a structure that is operable to couple programming and/or control signals to a specific device or component of a quantum processor. In the illustrated embodiment, each of programming interfaces 121-125 is realized by a respective inductive coupling structure that is controlled by a programming system (not shown). Such a programming system may be separate from quantum processor 100, or it may be included locally (i.e., on-chip with quantum processor 100) as described in US Patent Publication 2008-0215850.

In the operation of quantum processor 100, programming interfaces 121 and 124 may each be used to couple a respective flux signal $\phi_{CJJ}$ into a respective compound Josephson junction 131, 132 of qubits 101 and 102, thereby realizing the $\Delta_i$ terms in the system Hamiltonian. This coupling provides the $\sigma^x$ terms of equation 2. Similarly, programming interfaces 122 and 123 may each be used to couple a respective flux signal $\phi_X$ into a respective qubit loop of qubits 101 and 102, thereby realizing the $h_i$ terms in the system Hamiltonian. This coupling provides the $\sigma^z$ terms of equations 1 and 2. Programming interface 125 may be used to control the coupling between qubits 101 and 102 through coupler 111, thereby realizing the $J_{ij}$ terms in the system Hamiltonian. This coupling provides the $\sigma^z\sigma^z$ terms of equations 1 and 2. In FIG. 1, an exemplary contribution of each of programming interfaces 121-125 to the system Hamiltonian is indicated in boxes 121a-125a, respectively.

A small-scale, two-qubit quantum annealing computation may be performed using the portion of quantum processor 100 shown in FIG. 1. The problem Hamiltonian described by equation 1 may be realized by using programming interfaces 122 and 123 to establish the $h_i\sigma^z$ terms and coupler 111, as controlled by programming interface 125, to establish the $J_{12}\sigma^z\sigma^z$ term. During annealing, the disorder term $\Gamma H_D$ may be realized by using programming interfaces 121 and 124 to establish the $\Delta_i\sigma^x$ terms. This induces tunnel splitting in qubits 101 and 102. As the system evolves, the $\Delta_i\sigma^x$ terms established by programming interfaces 121 and 124 may be gradually removed such that, at the end of the annealing process, only the terms that define equation 1 remain.

As previously described, a straightforward approach to quantum annealing with superconducting flux qubits is to use fixed flux biases applied to the qubit loops ($\phi_X$) through programming interfaces 122 and 123 and to the coupler ($\phi_J$) 111 through programming interface 125 (i.e., the fixed quantum annealing protocol). This approach, however, does not account for the fact that modulation of the control signal applied to the compound Josephson junction 131 of a given qubit 101 (e.g., through programming interface 121) influences both the qubit's tunnel splitting and the qubit's persistent current. Therefore, adjusting the CJJ biases to reduce the $\Delta_i$ terms that drive the annealing evolution may also undesirably change the magnitudes of $h_i$ and $J_{ij}$ in the problem Hamiltonian.

In accordance with the present systems, methods and apparatus, a protocol for controlled quantum annealing with superconducting flux qubits is described. Controlled quantum annealing can be advantageous over fixed quantum annealing because it provides appropriate conditions for continuous convergence to a target low-energy state (such as a ground state) during evolution of the system Hamiltonian.

In controlled quantum annealing, the flux biases ($\phi_X$ and $\phi_J$) that are applied to the qubits (e.g., qubits 101 and 102) and/or couplers (e.g., coupler 111) are controlled dynamically as opposed to statically. In this way, the flux biases may be varied to compensate for the growth in the persistent current in each qubit as the disorder term $\Gamma H_D$ is gradually removed from the system Hamiltonian. In some embodiments, the dynamic flux biases are varied to maintain a substantially constant ratio in the system Hamiltonian while the disorder terms $\Delta_i\sigma^x$ coupled into each qubit are reduced.

In some embodiments, controlled quantum annealing may accommodate evolving $\phi_{CJJ}$ terms in the annealing schedule by maintaining a substantially fixed dimensionless target Hamiltonian. The "target" Hamiltonian is the problem Hamiltonian (e.g., equation 1) and the ground state of the problem Hamiltonian is independent of the overall absolute energy scale. For this reason, a scalar prefactor $E_p$ may be extracted from the problem Hamiltonian to provide dimensionless coefficients as in equation 1.1 below:

$$H_P = E_P\left[\sum_{i=1}^n \frac{h_i}{E_p}\sigma_i^z + \sum_{i,j=1}^n \frac{J_{ij}}{E_p}\sigma_i^z\sigma_j^z\right] \quad (1.1)$$

where $h_i/E_p$ and $J_{ij}/E_p$ are dimensionless ratios that ultimately define the energy state configuration (including low-energy states such as the ground state). In accordance with the present systems, methods and apparatus, some embodiments of controlled quantum annealing involve dynamically varying the flux biases during the annealing process such that the ratios of $h_i/J_{ij}$ remain substantially constant throughout the evolution to provide continuous convergence to a target low-energy state (e.g., ground state) of the system. In some embodiments, the scalar prefactor may be a common coupling factor $J_{ij}$, such as for example one unit of antiferromagnetic coupling $J_{AFM}$, such that $E_p = J_{AFM}$.

The problem Hamiltonian described in equation 1 has two types of variables: $h_i$ and $J_{ij}$. Both of these terms are influenced by the persistent current circulating in the qubit loop. The influence of the persistent current is described in equations 3A and 3B below:

$$h_i = 2\delta\Phi_x^i I_p^i \quad (3A)$$

$$J_{ij} = M_{ij}^{eff} I_p^i I_p^j \quad (3B)$$

Here, $I_p^i$ represents the magnitude of the persistent current in the qubit loop of the $i^{th}$ qubit, $\delta\phi_x^i$ represents at least a portion of the flux bias $\phi_X$ coupled into the qubit loop of the $i^{th}$ qubit by a programming interface (such as programming interface 122 coupled to qubit 101), and $M_{ij}^{eff}$ represents an effective mutual inductance between the $i^{th}$ and $j^{th}$ qubits realized by a coupler (such as coupler 111 between qubits 101 and 102). For simplification, one may assume that the persistent currents are uniform amongst all of the qubits, such that $I_p^i = I_p^j = I_p$. Thus, from equations 3A and 3B it is apparent that $h_i$ is directly proportional to $I_p$ and $J_{ij}$ is directly proportional to $I_p^2$. For fixed annealing in which $\delta\phi_x^i$ and $M_{ij}^{eff}$ are typically constants, the ratio of the two variable terms in the problem Hamiltonian described by equation 1 is inversely proportional to $I_p$ as indicated in equation 4:

$$\frac{h_i}{J_{ij}} \propto \frac{1}{I_p} \quad (4)$$

In some embodiments of the present systems, methods and apparatus, it is desirable to maintain a substantially constant ratio while the disorder terms $\Delta_i\sigma^x$ coupled into each qubit are reduced. An example of a particularly beneficial ratio to be held substantially constant is the ratio of $h_i$ to $J_{ij}$ (for a given value of $J_{ij}$, such as $J_{ij}=J_{AFM}$ for one unit of antiferromagnetic coupling, though those of skill in the art will appreciate that other values of $J_{ij}$ may similarly be used), which is shown in equation 4 to depend on the persistent current $I_p$ in each qubit. Thus, the ratio of $h_i$ to $J_{AFM}$ may be held substantially constant by ensuring that the persistent current $I_p$ in each qubit remains substantially constant as the $\Delta_i \sigma^x$ terms are removed. Ensuring that the ratio of $h_i$ to $J_{AFM}$ remains substantially constant facilitates continuous convergence to a target low-energy state (such as a ground state) during the annealing process.

Equations 3A and 3B provide two means by which the ratio of $h_i$ to $J_{AFM}$ (equation 4) may be held constant: the mutual inductance $M_{ij}^{eff}$ realized by the coupler may be compensated by a factor proportional to $1/I_P$, or the flux bias $\delta\phi_x^i$ coupled to the qubit loop of each qubit may be compensated by a factor proportional to $I_P$. In some embodiments, both the mutual inductance $M_{ij}^{eff}$ and the flux bias $\phi_x$ may be compensated to provide a constant ratio of $h_i$ to $J_{AFM}$.

While control of the mutual inductance $M_{ij}^{eff}$ realized by the coupler may theoretically be used to compensate for the growth of $I_P$ during the annealing process, in some implementations this form of control can be particularly difficult to achieve. Thus, in some embodiments it may be preferred to compensate for the growth in the qubit persistent current $I_P$ that is induced by the change in $\phi_{CJJ}$ by accordingly adjusting the flux bias $\phi_x$ coupled to the qubit loop of each qubit. From equations 3A and 3B, it follows that:

$$\frac{h_i}{J_{AFM}} = \frac{2\delta\Phi_x^j}{M_{ij}^{AFM} I_p} \qquad (5)$$

Thus, the ratio of $h_i$ to $J_{AFM}$ may be held substantially constant as $I_P$ grows by making the flux bias $\phi_x$ coupled to the qubit loop of each qubit grow in proportion to the growth of $M_{ij}^{AFM} I_P$. Thus, controlled quantum annealing may be realized by varying the total effective flux bias $\phi_x$ coupled to the qubit loop of each qubit in proportion to the growth of $M_{ij}^{AFM} I_P$, as described in equation 6:

$$\delta\Phi_x^j = \frac{h_i}{J_{AFM}} \cdot \frac{1}{2} M_{ij}^{AFM} I_p \qquad (6)$$

In some embodiments, a single measurement of $M_{ij}^{AFM} I_P$ for each qubit is sufficient to establish a controlled annealing protocol. From this single measurement, one may scale the result by the target value of $h_i/J_{AFM}$ in order to maintain continuous convergence towards a target low-energy state (such as a ground state) during evolution of the system Hamiltonian. As mentioned previously, those of skill in the art will appreciate that the antiferromagnetic coupling state ("AFM") is used as an example here and that, in practice, any specific coupling state (such as ferromagnetic coupling, or any non-zero coupling in between complete ferromagnetic and complete antiferromagnetic coupling) may be used as the basis for establishing the ratio of $h_i$ to $J_{ij}$.

Figure 2:
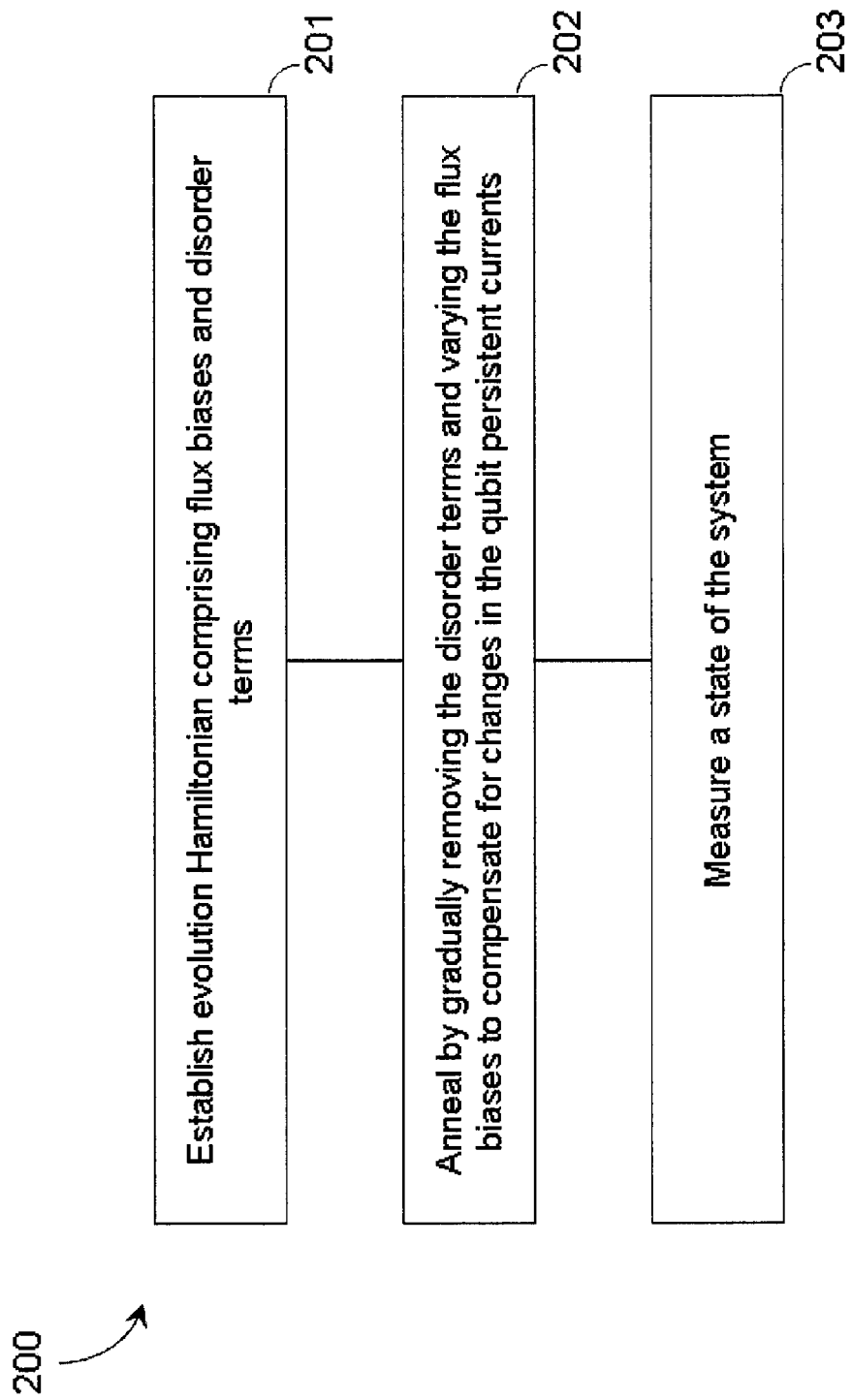
FIG. 2 is a flow-diagram of an embodiment of a method for performing controlled quantum annealing with superconducting flux qubits, according to one illustrated embodiment.

The various embodiments described herein provide systems, methods and apparatus for an improved approach to quantum annealing called controlled quantum annealing. FIG. 2 is a flow-diagram of an embodiment of a method 200 for performing controlled quantum annealing with superconducting flux qubits. Method 200 comprises three acts 201-203 and incorporates dynamically-varying flux biases during the annealing process. In act 201, the evolution Hamiltonian is established by applying the appropriate flux biases and disorder terms. In some embodiments, the evolution Hamiltonian may be established by configuring a superconducting quantum processor, such as that shown in FIG. 1, to substantially realize the evolution Hamiltonian described by equation 2. In some embodiments, the problem Hamiltonian (such as the problem Hamiltonian described by equation 1) may first be established by accordingly applying flux biases to the qubit loops of the qubits and to the couplers, and then the disorder terms may be added by applying flux signals to the compound Josephson junctions of the qubits. In act 202, the quantum processor is controllably annealed by gradually removing the disorder terms while simultaneously varying the flux biases to compensate for changes in the qubit persistent currents. As previously described, the annealing process of removing the disorder terms can also induce changes in the qubit persistent currents which result in a discontinuous evolution path. In accordance with the present systems, methods and apparatus, this adverse effect is avoided by, during the annealing process, varying the flux biases that define the problem Hamiltonian to compensate for the changes in the qubit persistent currents induced by the annealing. In some embodiments, this compensation is controlled such that the ratio of $h_i$ to $J_{ij}$ for a given form of coupling (i.e., ferromagnetic, antiferromagnetic, or some intermediate form of coupling) remains substantially constant throughout the annealing process. In act 203, a state of the system is measured. In some embodiments, this may involve reading out the state of all or a portion of the qubits in the quantum processor by, for example, using a DC-SQUID to measure the persistent current state of each qubit. Further descriptions of systems, methods and apparatus for qubit readout are described in US Patent Publication 2006-0248618 and US Patent Publication 2009-0078931.

As previously described, controlled quantum annealing may be implemented by varying the local flux biases $\phi_x$ in proportion to the growth of $M_{ij}^{AFM} I_P$ as described by equation 6. It is thus useful to understand the evolution of $M_{ij}^{AFM} I_P$ through the annealing process, and to understand how this characteristic is influenced by variations in $\phi_x$ and $\phi_{CJJ}$. Once $M_{ij}^{AFM} I_P$ has been measured for each qubit (and assuming that $M_{ij}^{AFM}$ is nominally the same for all couplers), the couplers may then be set to any arbitrary coupling strength and any arbitrary $h_i/J$ may be applied to each qubit. In some embodiments, each qubit in the quantum processor may be analyzed to establish a lookup table of data describing the measured relationships between $M_{ij}^{AFM} I_P$, $\phi_x$ and $\phi_{CJJ}$. In such embodiments, the ratio of $h_i$ to $J_{ij}$ may be held substantially constant by using the lookup table to assign appropriate values to the flux biases $\phi_x$ as the system anneals. In other embodiments, a smooth phenomenological function may be used to fit to the data of the lookup table, and this function may be called upon when generating waveforms for the annealing procedure.

In some embodiments of controlled quantum annealing, the annealing schedule may be defined by an annealing waveform that is applied to the compound Josephson junction of each qubit. The variations in $\phi_{CJJ}$ induced by this waveform result in variations in the persistent current of each qubit, and this may be compensated by adding a compensation waveform to the flux biases $\phi_x$ applied to the qubit loop of each qubit. In some embodiments, it is advantageous to apply a compensation waveform to the qubit flux biases $\phi_x$ that comprises the modeled $M_{ij}^{AFM} I_P$ evolution multiplied by the target value of $h_i/J_{AFM}$. This compensation waveform may be synchronized with the annealing waveform applied to the compound Josephson junction of each qubit. Thus, in some embodiments it may be advantageous to establish the annealing waveform and then use the modeled $M_{ij}^{AFM}I_P$ evolution to generate the compensation waveform.

The controlled quantum annealing protocol as described herein is an example of a method that incorporates active compensation for unwanted fluctuations in the elements of a quantum processor during a quantum computation. In some embodiments, such active compensation may be advantageously achieved by providing systems for programming and administering the desired compensation signals. The present systems, methods and apparatus describe scalable hardware architectures for administering the dynamic compensation signals useful in, for example, the controlled quantum annealing protocol.

Applying a dynamic compensation signal to, for example, each qubit in a quantum processor would be greatly simplified if the same signal could be used to achieve the same effect in every qubit. In that scenario, a single global signal line could simply be coupled directly to each qubit and compensation could be achieved by using the single global signal line to couple the same compensation signal to every qubit. However, in practice discrepancies exist between qubits of a quantum processor (due to, for example, fabrication variations and/or programming/configuration differences) which may influence how each specific qubit responds to an applied compensation signal. These discrepancies can necessitate the application of device-specific dynamic compensation signals to accommodate device-specific behavior. That is, because fabrication variations and/or programming/configuration differences may cause each qubit to respond in its own way to changes in the CJJ bias during an annealing evolution, the desired compensation prescribed by the controlled quantum annealing protocol may not be achieved by coupling the same global compensation signal into each qubit. The present systems, methods and apparatus provide scalable techniques for locally programming the various elements of a quantum processor with device-specific dynamic signals. These scalable techniques are particularly well-suited for implementing controlled quantum annealing using a quantum processor comprising superconducting flux qubits. Those of skill in the art will appreciate, however, that the concepts embodied in the present systems, methods and apparatus may be adapted for use in applying other forms of control signals to the elements of any type of quantum processor.

Those of skill in the art will appreciate that the set of device-specific dynamic signals that achieve the compensation required for controlled quantum annealing may be applied by introducing compensation signal lines such that at least one unique compensation signal line communicates with each device. However, as the size of the superconducting quantum processor increases this approach can quickly necessitate an impractical and unmanageable number of signal lines. The various embodiments described herein address this issue by providing systems, methods and apparatus for locally applying dynamic signals to a plurality of devices without necessitating a unique signal line for each device.

The number of signal lines that are required to control the various elements of a superconducting quantum processor may be regulated by implementing local programming of the elements of the quantum processor, as described in U.S. patent application Ser. No. 11/950,276. Locally programming the elements of a superconducting quantum processor may involve the use of superconducting digital-to-analog converters ("DACs"), such as those described in US Patent Publication 2009-0082209. In some embodiments, at least one DAC may be configured to communicably couple to at least one demultiplexer circuit such as those described in U.S. Provisional Patent Application Ser. No. 61/058,494, filed Jun. 3, 2008, entitled "Systems, Methods and Apparatus For Superconducting Demultiplexer Circuits." In some embodiments, at least one DAC may be configured to communicably couple to at least one superconducting shift register, such as a single flux quantum shift register or a shift register comprising latching qubits as described in U.S. patent application Ser. No. 12/109,847. For example, in an embodiment of a superconducting quantum processor that employs local programming, each of programming interfaces 121-125 from FIG. 1 may include or couple to a respective DAC.

In typical applications of fixed quantum annealing, the only time-varying signal is the disorder term that is applied to the CJJ (e.g., CJJs 131 and 132 from FIG. 1) of each qubit. However, in controlled quantum annealing at least one time-varying compensation signal may be applied to the qubit loop of each qubit to compensate for the changes in the persistent current that result from varying the disorder term. As previously described, the exact form and magnitude of an appropriate dynamic compensation signal may depend on the characteristics of the particular qubit to which it is being applied, and these characteristics may be inconsistent from one qubit to the next as a result of variations during fabrication or parametric discrepancies imposed by the system configuration.

The various embodiments described herein provide systems, methods and apparatus for locally programming the elements of a superconducting quantum processor with device-specific dynamic signals while limiting the required number of signal lines. In some embodiments, this is achieved by introducing at least one global signal line that is coupled to each qubit (or to a subset of qubits) through a respective multiplier that provides independently tunable scalar multiplication of a dynamic signal carried by the global signal line. In some embodiments, a multiplier may resemble a coupler (e.g., coupler 111 from FIG. 1) and the scalar multiplication provided by each multiplier may be controlled to accommodate the characteristics of the particular qubit (or other device) to which the multiplier is coupled. In some embodiments, the multiplier may preferably include a CJJ as in the embodiments of couplers described in US Patent Publication 2008-0238531.

Throughout this specification and the appended claims, the term "multiplier" is used to refer to a structure that is configured to mediate a communicable coupling between a first device and a second device, and operable to apply a gain to a signal coupled from the first device to the second device. Furthermore, the term "global signal line" is used to refer to a signal line that is configured to communicably couple to multiple elements (e.g., qubits and/or couplers) in a quantum processor.

In some embodiments, a multiplier may be used to couple a signal from a global signal line to the qubit loop of a superconducting flux qubit. For example, a multiplier may be coupled to the qubit loop of a superconducting flux qubit in order to provide the compensation signals prescribed by the controlled quantum annealing protocol.

Figure 3:
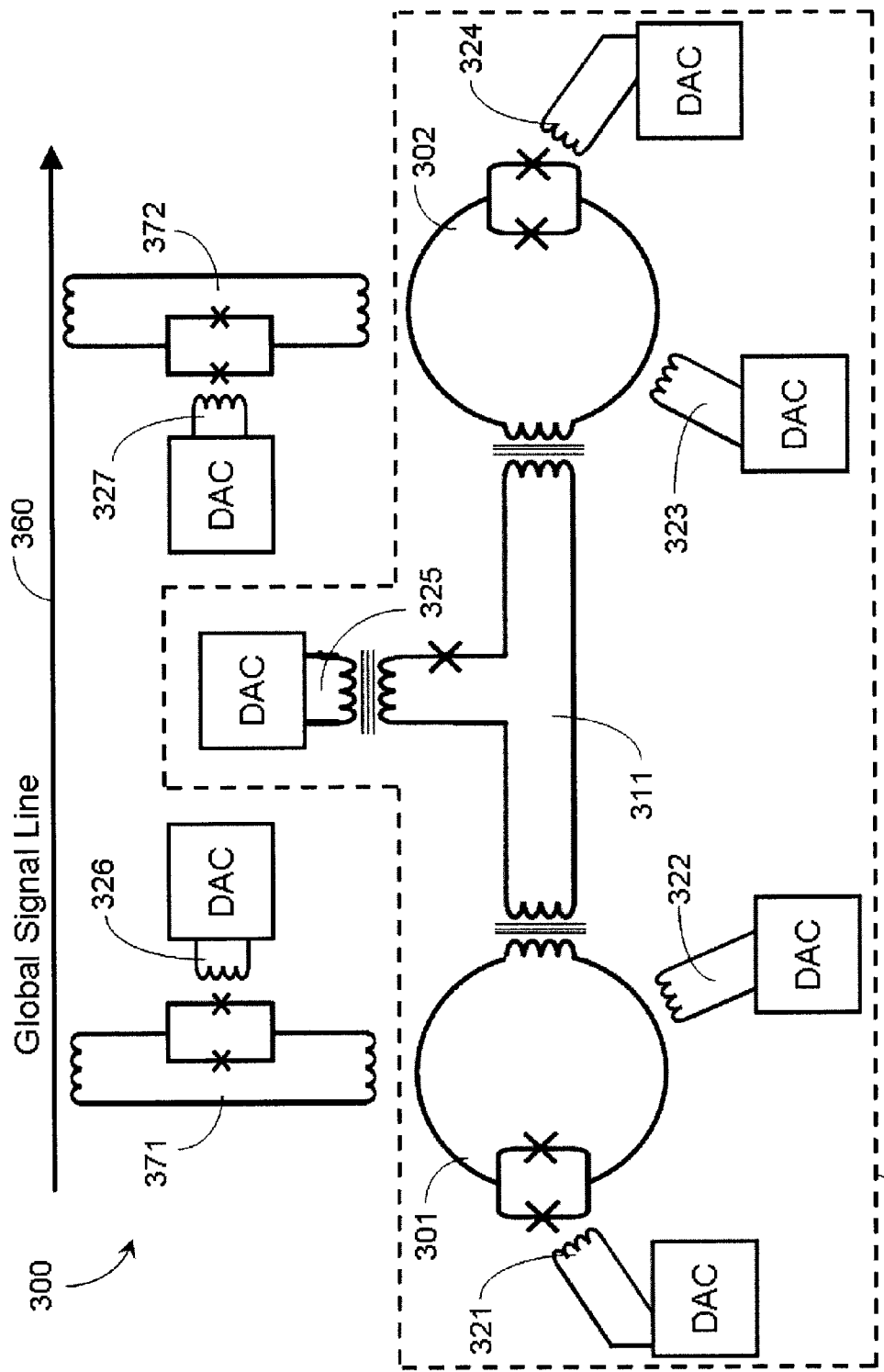
FIG. 3 is a schematic diagram of a portion of an embodiment of a superconducting quantum processor that is adapted to incorporate local administration of device-specific dynamic control signals.

FIG. 3 is a schematic diagram of a portion of an embodiment of a superconducting quantum processor 300 that is adapted to incorporate local administration of device-specific dynamic control signals. Such dynamic control signals may be used, for example, as compensation signals to implement controlled quantum annealing. The portion of superconducting quantum processor 300 illustrated in FIG. 3 includes sub-portion 350, which is similar in some respects to the portion of a superconducting quantum processor 100 illustrated in FIG. 1, except that in FIG. 3 each of programming interfaces 321-325 is explicitly shown as being coupled to a respective local DAC. Sub-portion 350 of the portion of a superconducting processor 300 illustrated in FIG. 3 includes two qubits 301, 302 and one tunable coupler 311, though those of skill in that art will appreciate that any number of qubits and qubit coupling devices may be included in a complete superconducting quantum processor.

In contrast to superconducting quantum processor 100, superconducting quantum processor 300 is adapted to incorporate local administration of device-specific dynamic signals. Outside of sub-portion 350, superconducting quantum processor 300 includes a global signal line 360 which may be configured to carry any desired signal. In some embodiments, global signal line 360 may carry a dynamic compensation signal to compensate for changes in the qubit persistent currents induced by changes in the single qubit tunneling splitting in accordance with the controlled quantum annealing protocol. Global signal line 360 is coupled to each of qubits 301 and 302 by a respective multiplier. Multiplier 371 couples global signal line 360 to qubit 301 and multiplier 372 couples global signal line 360 to qubit 302. Multipliers 371 and 372 may each take the form of a variety of different coupling devices, including but not limited to those described in US Patent Publication 2006-0147154, US Patent Publication 2008-0238531, and US Patent Publication 2008-0274898, though it may be advantageous to ensure that each of multipliers 371 and 372 includes a respective CJJ. In some embodiments, multipliers 371 and 372 are respectively controlled by programming interfaces 326 and 327, each of which may include or be coupled to a respective DAC. In the illustrated embodiment, programming interface 326 is configured to communicably couple to the CJJ of multiplier 371 and programming interface 327 is configured to communicably couple to the CJJ of multiplier 372. Control signals administered by programming interface 326 may be used to tune the susceptibility of multiplier 371 and control signals administered by programming interface 327 may be used to tune the susceptibility of multiplier 372. Tuning the susceptibility of a coupler effectively influences the gain that the coupler applies to an input signal. In this way, each of multipliers 371 and 372 may be used to provide a respective scaling factor to the dynamic signal(s) coupled from global signal line 360 to qubits 301 and 302, respectively.

In accordance with the present systems, methods and apparatus, a coupling device may be used as a multiplier 371, 372 to scale a signal carried by a global signal line 360 and administer the scaled signal to a specific element of a superconducting quantum processor. In some embodiments, the qubits in a quantum processor may all exhibit a response curve that is substantially similar in shape, but scaled differently as a result of fabrication variations or configuration differences. For this reason, the general shape of the dynamic compensation signal may be substantially similar for each qubit, requiring only scaling to accommodate the response of each individual qubit. Thus, in some embodiments, a single global signal line 360 may carry a dynamic compensation signal embodying the general time-varying shape necessary to compensate for changes in the qubit persistent currents, and this signal may be coupled to each qubit (e.g., qubits 301 and 302) through a respective multiplier (e.g., multipliers 371 and 372, respectively) to provide the desired scaling. This approach is readily scalable for use in a quantum processor comprising any number of qubits. For example, any number of qubits may be coupled to global signal line 360, each through a respective multiplier. In this way, device-specific dynamic compensation signals may be locally applied to each element of a quantum processor without necessitating the implementation of an impractical or unmanageable number of control signal lines.

In some embodiments, a further degree of customizability in the dynamic signals applied to each qubit may be desired. For example, in some applications simply scaling a single global signal waveform may not be sufficient to accommodate the uniqueness of each qubit. To provide a further degree of customizability in the dynamic signal(s) applied to each qubit without necessitating a large number of additional signal lines, each qubit itself may be used as an adder to sum the contributions of multiple multipliers. That is, at least two distinct dynamic signals may be coupled into the qubit loop of a qubit, each through a respective multiplier and with each multiplier applying a respective scaling factor.

Figure 4:
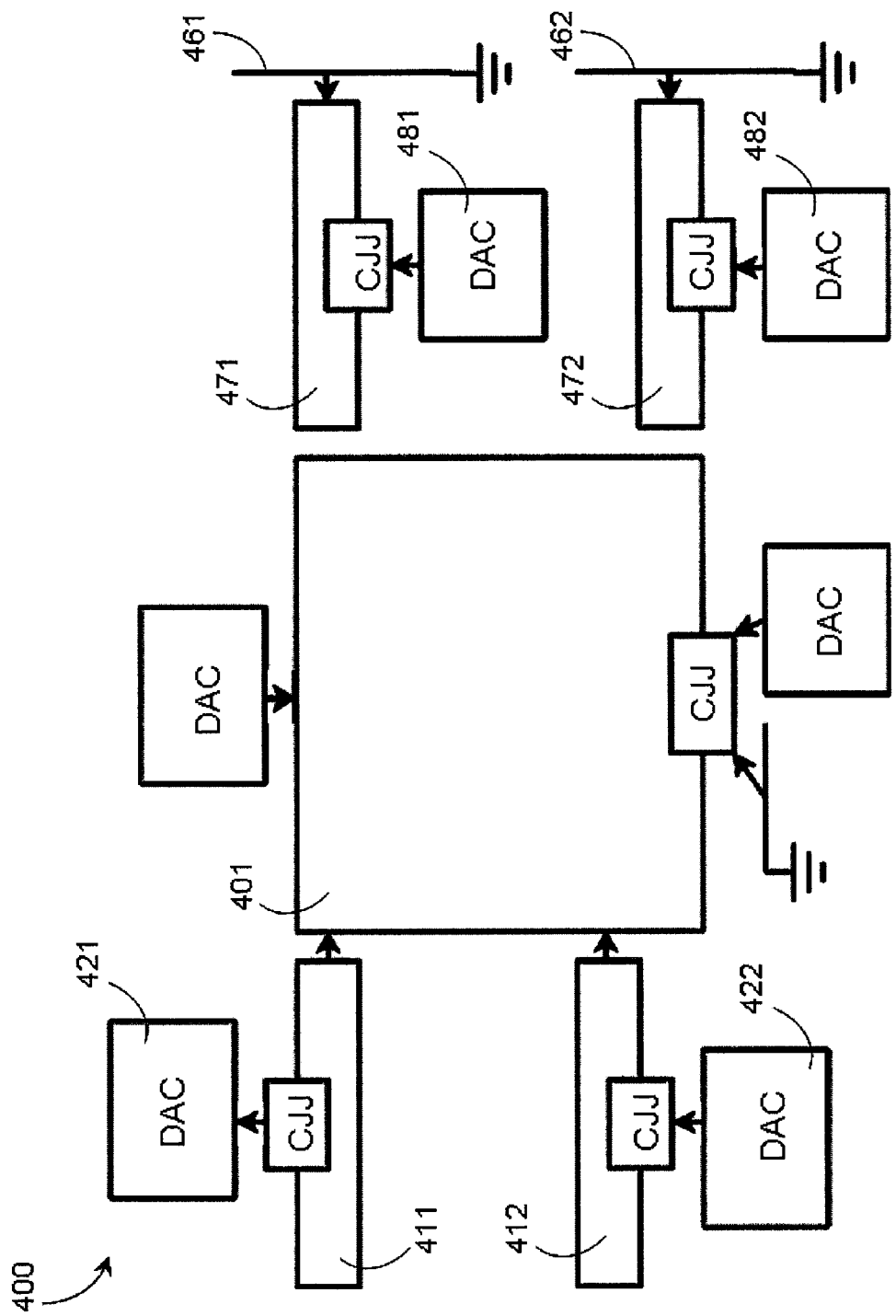
FIG. 4 is a schematic diagram of a qubit control system according to one illustrated embodiment.

FIG. 4 is a schematic diagram of a qubit control system 400 including a single superconducting qubit 401 and two inter-qubit couplers 411 and 412 which, in some embodiments, may each couple qubit 401 to a respective other qubit (not shown) in a quantum processor. Each of inter-qubit couplers 411 and 412 includes a respective CJJ and is controlled by a respective programming interface comprising a respective DAC 421, 422 that is coupled to the CJJ. Those of skill in the art will appreciate that any number of inter-qubit couplers may similarly be employed depending on the qubit-coupling architecture of the quantum processor. Qubit control system 400 also includes two multipliers 471 and 472, each of which is coupled to qubit 401 and a respective global signal line 461 and 462. Multiplier 471 is configured to communicably couple global signal line 461 to qubit 401 and multiplier 462 is configured to communicably couple global signal line 462 to qubit 401. Each of multipliers 471 and 472 is also include a respective CJJ that is coupled to a respective control DAC 481 and 482. DAC 481 influences the scaling that multiplier 471 applies to the dynamic signal carried by global signal line 461 before coupling this signal to qubit 401. Similarly, DAC 482 influences the scaling that multiplier 472 applies to the dynamic signal carried by global signal line 462 before coupling this signal to qubit 401. The respective signals coupled by multipliers 471 and 472 may be combined (i.e., effectively summed) in qubit 401. Each of global signal lines 461 and 462 may contribute any shape of time-varying waveform which may be respectively scaled by multipliers 471 and 472 before being combined in qubit 401. Depending on the relative scaling factors of multipliers 471 and 472 and the relative waveforms of the signals carried by global signal lines 461 and 462, a wide variety of effective waveforms may be coupled to qubit 401. Furthermore, those of skill in the art will appreciate that any number of global signal lines may similarly be coupled to qubit 401, each through a respective multiplier.

In some embodiments, the summing of multiple control signals may be achieved outside of a qubit such that only the summed signal is coupled to the qubit. For example, in alternative embodiments qubit control system 400 may include an adder that interrupts the coupling between multipliers 471, 472 and qubit 401 so that the signals contributed by multipliers 471 and 472 are combined in the adder before they are coupled to qubit 401. Those of skill in the art will appreciate that an adder may comprise, for example, a loop of superconducting material with, in some embodiments, inductive elements to facilitate coupling to multipliers 471, 472 and qubit 401.

In an architecture of a quantum processor comprising multiple qubits, any number of qubits may similarly be coupled to any number of global signal lines, each through a respective multiplier. Thus, the present systems, methods and apparatus provide a mechanism for locally applying dynamic signal waveforms to the various elements of a quantum processor using a limited number of signal lines, while still providing a degree of customizability to accommodate the individual characteristics of each qubit resulting from, for example, fabrication variations. In some embodiments, dynamic compensation signals may be used to correct for unwanted fluctuations in qubit parameters due to the interrelatedness of some qubit parameters. For example, in some embodiments, dynamic compensation signals may be used to compensate for unwanted fluctuations in qubit persistent currents throughout the evolution of a quantum processor. In some embodiments, dynamic and/or static compensation signals may be used to accommodate unwanted discrepancies in qubit characteristics due to fabrication variations. For example, in some embodiments dynamic and/or static compensation signals may be used to compensate for asymmetry in the Josephson junctions that comprise a CJJ (e.g., CJJs 131 and 132).

FIGS. 3 and 4 provide illustrative embodiments of implementations of multipliers according to the present systems, methods and apparatus, wherein each multiplier is used to couple a signal from a global signal line to the qubit loop of a respective qubit. However, in other embodiments, a multiplier may be used to couple a signal from a global signal line to the CJJ or any other part of a qubit.

Figure 5:
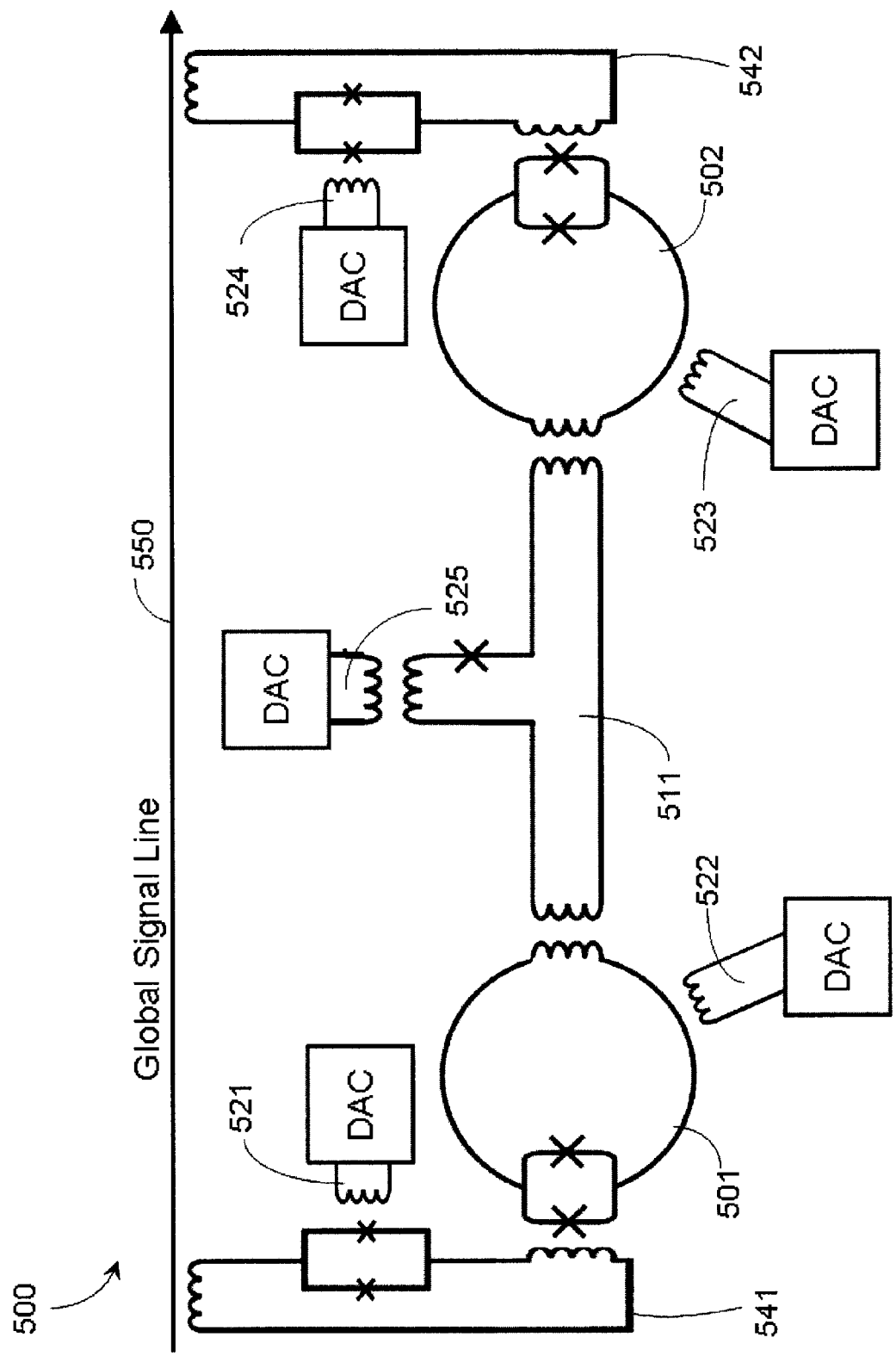
FIG. 5 is a schematic diagram of an embodiment of a portion of a superconducting quantum processor that implements local programming of a global signal line coupled to the compound Josephson junction of each qubit.

FIG. 5 is a schematic diagram of another embodiment of a portion of a superconducting quantum processor 500 that implements local programming of a global signal coupled to the CJJ of each qubit. The portion of a superconducting quantum processor 500 shown in FIG. 5 is similar to the portion of superconducting processor 300 shown in FIG. 3 in that it includes two qubits 501, 502 respectively controlled by programming interfaces 522 and 523 and coupled together through a coupling device 511 that is controlled by programming interface 525. However, in the portion of superconducting processor 500 shown in FIG. 5, a global signal line 550 is configured to communicably couple to the CJJ of each qubit through a respective multiplier 541, 542. For example, global signal line 550 is configured to communicably couple to the CJJ of qubit 501 through multiplier 541 and to the CJJ of qubit 502 through multiplier 542. Multipliers 541 and 542 are respectively controlled by programming interfaces 521 and 524, each of which may include a respective local DAC. Each of multipliers 541 and 542 may provide an independent scaling factor to the dynamic signals coupled from global signal line 550 to qubits 501 and 502, respectively. Based on the configuration of their respective DACs, programming interfaces 521 and 524 may each control the effective scaling factors provided by multipliers 541 and 542, respectively, to the global signal carried by global signal line 550. By using multipliers 541, 542 to mediate the coupling between the global signal line 550 and the CJJ of each qubit 501, 502, qubit-specific scaling of the global signal is enabled, which may be advantageous in many different implementations of quantum annealing and/or adiabatic quantum computation. For example, qubit-specific scaling of the global signal coupled to the CJJ of each qubit is implemented in the algorithms described in U.S. Provisional Patent Application Ser. No. 61/092,665, filed Aug. 28, 2008 and entitled "Systems, Methods and Apparatus to Avoid Local Minima in Quantum Computation."

Throughout this specification, reference is often made to a "global signal line", which was previously defined as a signal line that is configured to communicably couple to multiple elements (e.g., qubits and/or couplers) in a quantum processor. While local control circuitry may be implemented for the purpose of, for example, programming static parameters of the elements of a quantum processor in accordance with US Patent Publication 2008-0215850, a global signal line is typically advantageous to provide dynamic signals to the elements of a quantum processor. In some embodiments, local control circuitry may be implemented to program digital signals and global signal lines may be implemented to program analog signals. In some embodiments, it may be preferred to minimize the number of global signal lines by implementing one dedicated global signal line for each dynamic signal needed. The annealing signal that is coupled to the CJJ of each qubit is an example of a dynamic signal, thus in some embodiments it may be preferred to use a single global signal line configured to communicably couple the same dynamic annealing signal to the CJJ of each respective qubit. In accordance with the present systems, methods and apparatus, the coupling between this global annealing signal line and each respective CJJ may be mediated through a respective multiplier to provide a qubit-specific scaling factor to the dynamic annealing signal that is received by each qubit. The compensation signal that is coupled to the qubit loop in order to implement the controlled quantum annealing protocol is an example of another dynamic signal for which a dedicated global signal is preferred.

While implementing a single dedicated global signal line for each dynamic signal can be advantageous in enhancing the scalability of the system, such a scheme can make it difficult to isolate and control various subsets of the elements of the quantum processor. Isolating and controlling various subsets of the elements of a quantum processor may be desirable, for example, during system calibration.

The present systems, methods and apparatus describe techniques for calibrating the elements of a quantum processor. The various elements of a quantum processor (e.g., qubits and coupling devices) typically need to be calibrated before the quantum processor is operated to solve computational problems. While these elements may be theoretically designed to behave in specific ways, a calibration procedure is typically necessary to confirm their actual behavior in a physical system. Specifically, in using a quantum processor to solve a computational problem by adiabatic quantum computation or quantum annealing, it may be advantageous to calibrate the problem Hamiltonian parameters to high precision in order to ensure control of the annealing schedule and parameter definition. This helps to ensure that, for example, the problem being solved by the quantum processor accurately represents the problem for which a solution is desired.

High precision device calibration generally necessitates high precision measurement of device parameters. In a flux-based superconducting quantum processor such as that illustrated in FIG. 1, measurements are typically made using magnetometers, such as DC-SQUIDs. However, DC-SQUIDs may not be appropriate to use as sensors to calibrate device parameters because the backaction of a DC-SQUID readout device on a qubit is generally too large for calibrating flux qubits through the critical range of applied flux in which quantum annealing occurs. Furthermore, measurements made with DC-SQUIDs may not directly obtain the quantities of interest for device calibration, but rather the measurements may enable calculation of the quantities of interest after additional measurements are made.

In accordance with the present systems, methods and apparatus, high precision direct measurement of the parameters of a first qubit may be achieved by using a second qubit as a sensor qubit. The concept of using a first qubit to sense the parameters of a second qubit is described in US Patent Publication 2006-0147154, US Patent Publication 2006-

0248618, and US Patent Publication 2009-0078931. Applying this concept in calibrating the elements of a quantum processor may enable measurements of higher precision, and therefore calibration of higher precision, than otherwise attainable by conventional DC-SQUID-based measurement techniques.

Throughout this specification and the appended claims, the term "sensor qubit" is used to refer to a qubit that is operated as a measurement device and the term "source qubit" is used to refer to a qubit whose parameters are being measured.

In some embodiments, an effective calibration technique enables arbitrary interactions between pairs of coupled qubits, with one qubit acting as a source qubit and the other qubit acting as a sensor qubit. That is, high precision calibration may be achieved in a quantum processor comprising a network of inter-coupled qubits by isolating respective pairs of coupled qubits and, for each respective pair of qubits, using one qubit to sense the parameters and behavior of the other qubit. In order to achieve arbitrary two-qubit manipulations between a given pair of coupled qubits, it is advantageous to isolate the pair of qubits from the other qubits. This may be achieved by implementing tunable coupling devices that are capable of providing zero coupling between qubits. Examples of such tunable coupling devices are illustrated in FIGS. 1 and 3-6, and described in Harris, R. et al., "Sign and Magnitude Tunable Coupler for Superconducting Flux Qubits", arXiv.org: cond-mat/0608253 (2006), pp. 1-5, Massen van den Brink, A. et al., "Mediated tunable coupling of flux qubits," New Journal of Physics 7 (2005) 230, and Harris, R. et al., "A Compound Josephson Junction Coupler for Flux Qubits With Minimal Crosstalk", arXiv.org:0904.3784 (2009), pp. 1-4. Furthermore, achieving arbitrary two-qubit manipulations may be facilitated by enabling independent or separate control of the parameters of each qubit in a given pair of qubits. That is, it may be advantageous to enable separate tuning of the parameters of a first qubit (e.g., the source qubit) and a second qubit (e.g., the sensor qubit) in a given pair of qubits.

In conventional designs of superconducting quantum processors designed for adiabatic quantum computation and/or quantum annealing, all qubits in the quantum processor are typically coupled to the same global annealing signal line. For example, in the portion of a conventional superconducting quantum processor 500 shown in FIG. 5, qubits 501 and 502 are coupled to the same global annealing signal line 550. This has the advantage of limiting the number of signal lines required to operate the system and ensuring substantial synchronization of the annealing signal across all of the qubits. However, this approach has the disadvantage of being unable to simultaneously couple different dynamic signals to the CJJs of multiple qubits that make up the quantum processor.

In accordance with the present systems, methods and apparatus, arbitrary two-qubit manipulations may be achieved by implementing a small number of interdigitated global signal lines such that the two qubits that make up any pair of coupled qubits are each respectively coupled to a different global signal line. Enabling arbitrary two-qubit manipulations can be advantageous for a wide-variety of quantum processor operations including, but not limited to, high precision device calibration. Those of skill in the art will appreciate that the present systems, methods and apparatus may be applied in systems that include implementations of on-chip DACs and scalar multipliers, similar to the embodiments shown in FIGS. 3-5.

Figure 6:
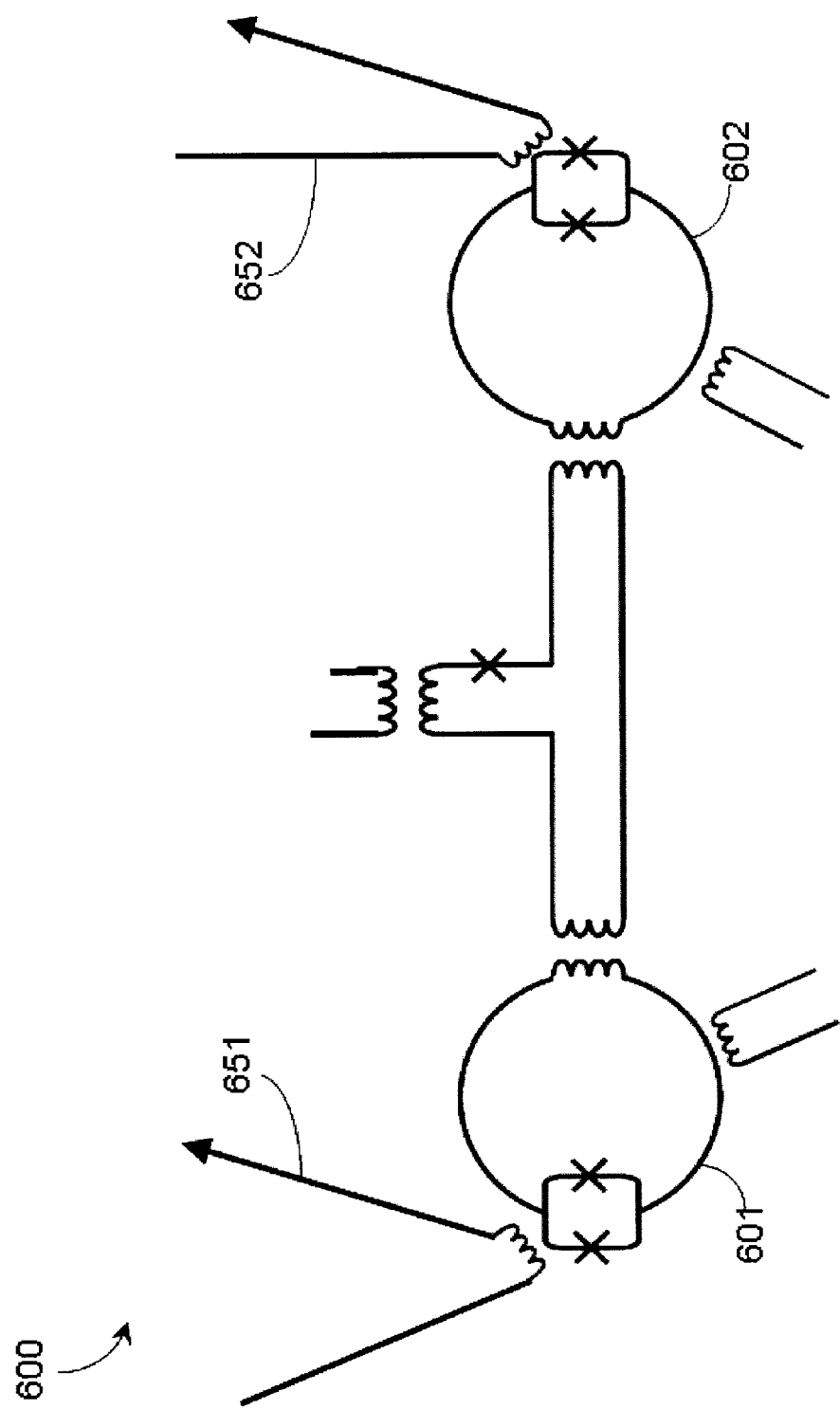
FIG. 6 is a schematic diagram of an embodiment of a portion of a superconducting quantum processor that is adapted to facilitate arbitrary two-qubit manipulations.

FIG. 6 is a schematic diagram of a portion of a superconducting quantum processor 600 that is adapted to facilitate arbitrary two-qubit manipulations. Quantum processor 600 is similar in some respects to quantum processor 100 from FIG. 1, except that quantum processor 600 includes two annealing signal lines 651 and 652 such that qubits 601 and 602 are each respectively coupled to a different annealing signal line. Using annealing signal lines 651 and 652, separate CJJ bias signals may be applied to each of qubits 601 and 602, respectively. While the ability to apply a unique CJJ bias to each individual qubit provides a high degree of qubit control, it is not currently practical to implement a large-scale quantum processor (e.g., comprising hundreds, thousands, or millions of qubits) with a unique annealing signal line being coupled to each qubit. However, in accordance with the present systems, methods and apparatus, sufficient qubit control to enable arbitrary two-qubit manipulations between any given pair of coupled qubits may be realized using a small number of interdigitated global annealing signal lines.

Figure 7:
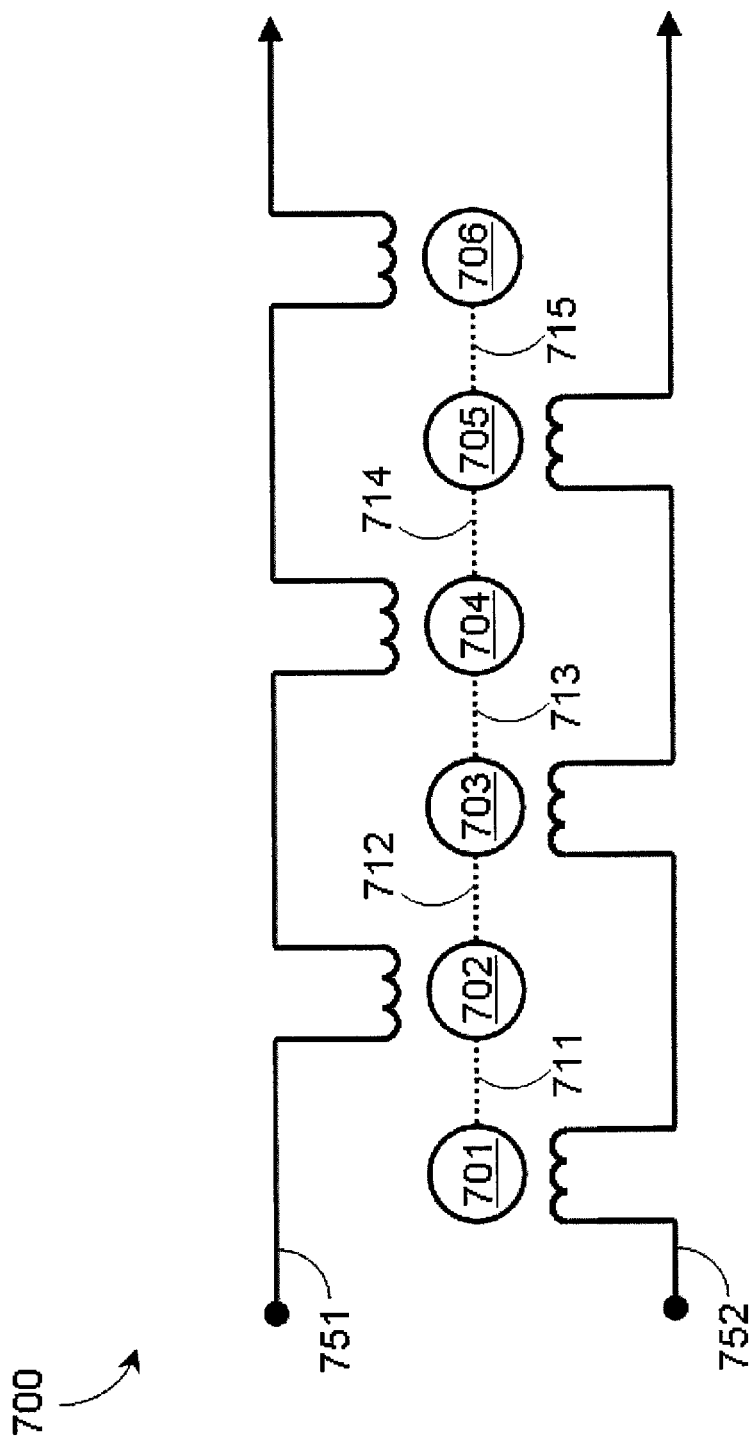
FIG. 7 is an illustrative diagram of an embodiment of a simple linear chain of nearest-neighbor-coupled qubits with interdigitated global signal lines.

Throughout this specification and the appended claims, the term "interdigitated" is used to refer to an arrangement of global signal lines that is interwoven such that any two qubits that are coupled together are each coupled to a different global signal line. FIG. 7 is an illustrative diagram of a simple linear chain of nearest-neighbor-coupled qubits 700 with two interdigitated global signal lines 751 and 752. Linear chain of qubits 700 includes six qubits 701-706 where each qubit is directly coupled to at least one other successively adjacent qubit in the chain by a coupling device 711-715 (drawn with broken lines for clarity). For example, qubit 701 is directly coupled to qubit 702 through coupling device 711, qubit 702 is directly coupled to qubit 701 through coupling device 711 and to qubit 703 through coupling device 712, qubit 703 is directly coupled to qubit 702 through coupling device 712 and to qubit 704 through coupling device 713, and so on. In linear chain of qubits 700, any pair of two directly coupled qubits (e.g., successively adjacent qubits) may be isolated by deactivating any coupling between the pair of qubits and the other qubits. For example, qubits 702 and 703 may be treated as an isolated pair of qubits by deactivating couplers 711 and 713. Arbitrary two-qubit manipulations may then be achieved with the pair of qubits comprising qubits 702 and 703 by using global signal line 751 to control, for example, the CJJ bias of qubit 702 and global signal line 752 to control, for example, the CJJ bias of qubit 703. To calibrate the pair of qubits, qubit 702 may first be used as a source qubit and qubit 703 may first be used as a sensor qubit to measure the parameters of qubit 702. Thus, the behavior of qubit 702 in response to various control signals may be monitored using qubit 703. Qubits 702 and 703 may then reverse roles, with qubit 703 serving as the source qubit and qubit 702 being used as the sensor qubit to monitor the behavior of qubit 703. Whether a particular qubit is used as a source qubit or a sensor qubit depends, at least in part, on the CJJ bias being applied to that qubit. Thus, the implementation of multiple global annealing signal lines enables the two qubits that make up any pair of coupled qubits in a quantum processor to simultaneously be used in different ways. The present systems, methods and apparatus provide interdigitated arrangements of multiple global annealing signal lines for various qubit-coupling architectures, in order to limit the number of additional global annealing signal lines needed to enable arbitrary two-qubit manipulations between pairs of coupled qubits.

Figure 8:
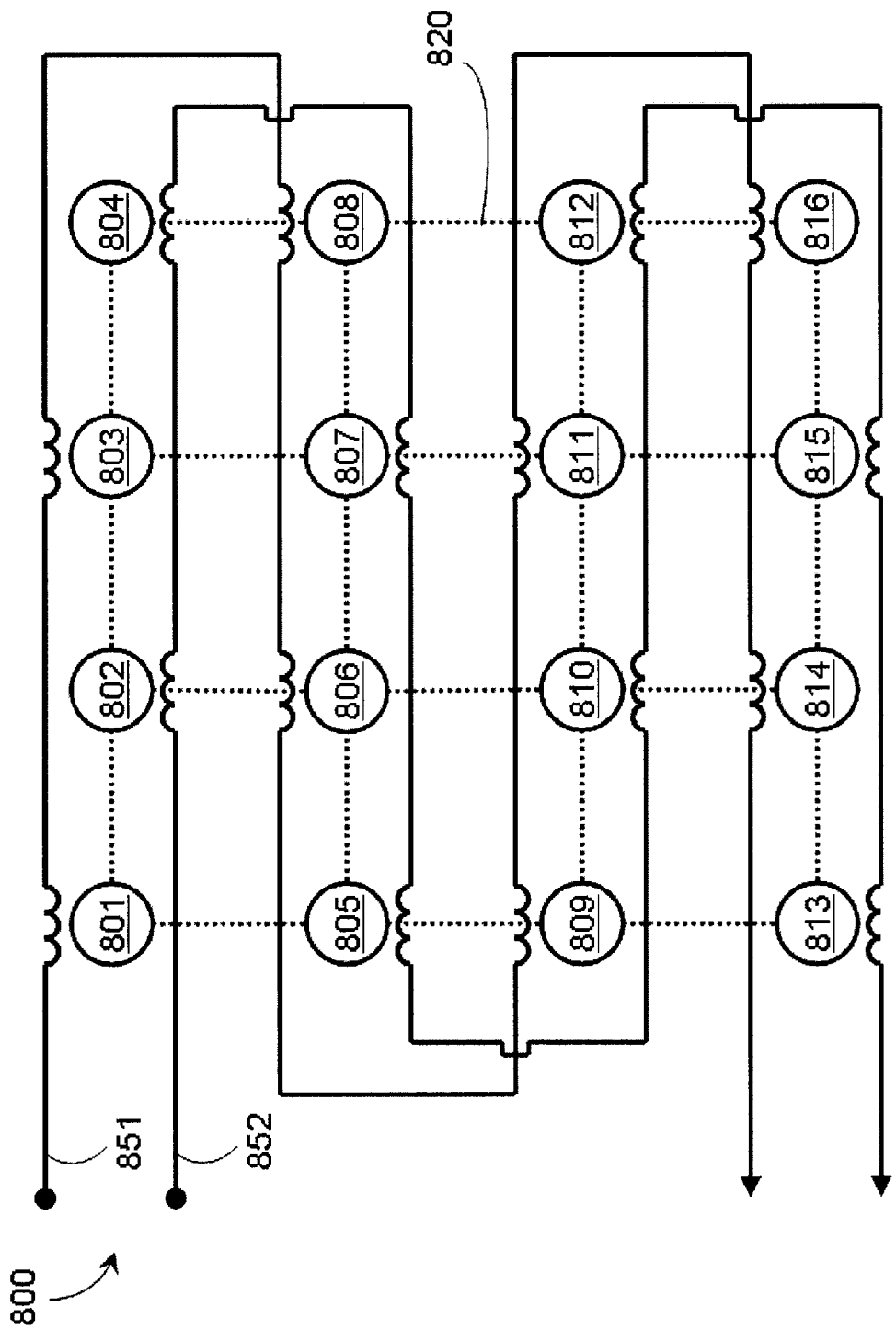
FIG. 8 is an illustrative diagram of an embodiment of an exemplary quantum processor comprising a square lattice of sixteen nearest-neighbor coupled qubits and two interdigitated global signal lines.

FIG. 8 is an illustrative diagram of an exemplary quantum processor 800 comprising a square lattice of sixteen nearest-neighbor coupled qubits 801-816. The nearest-neighbor coupling architecture of quantum processor 800 implements twenty-four coupling devices 820 (only one called out in the Figure, represented by broken lines for clarity), though those of skill in the art will appreciate that any number of qubits and coupling devices may be arranged in a similar pattern. In accordance with the present systems, methods and apparatus, only two global (e.g., annealing) signal lines, 851 and 852, are necessary to enable arbitrary two-qubit manipulations between any pair of coupled qubits in quantum processor 800. That is, for any two qubits that are coupled together in quantum processor 800 (i.e., any two nearest-neighbor qubits), one qubit is coupled to global signal line 851 and the other qubit is coupled to global signal line 852. Only two global signal lines may be needed in order to enable arbitrary two-qubit manipulations in a similar nearest-neighbor qubit-coupling architecture implementing any number of qubits and coupling devices. Using two interdigitated global signal lines, high precision calibration of device parameters may be achieved in a quantum processor implementing nearest-neighbor qubit coupling. Some embodiments may employ a greater number N of interdigitated global signal lines, although the number N will be less than the number of qubits in order to realize the benefits of the above described techniques, and will typically be much less than N, for instance as described below in reference to FIG. 9.

Figure 9:
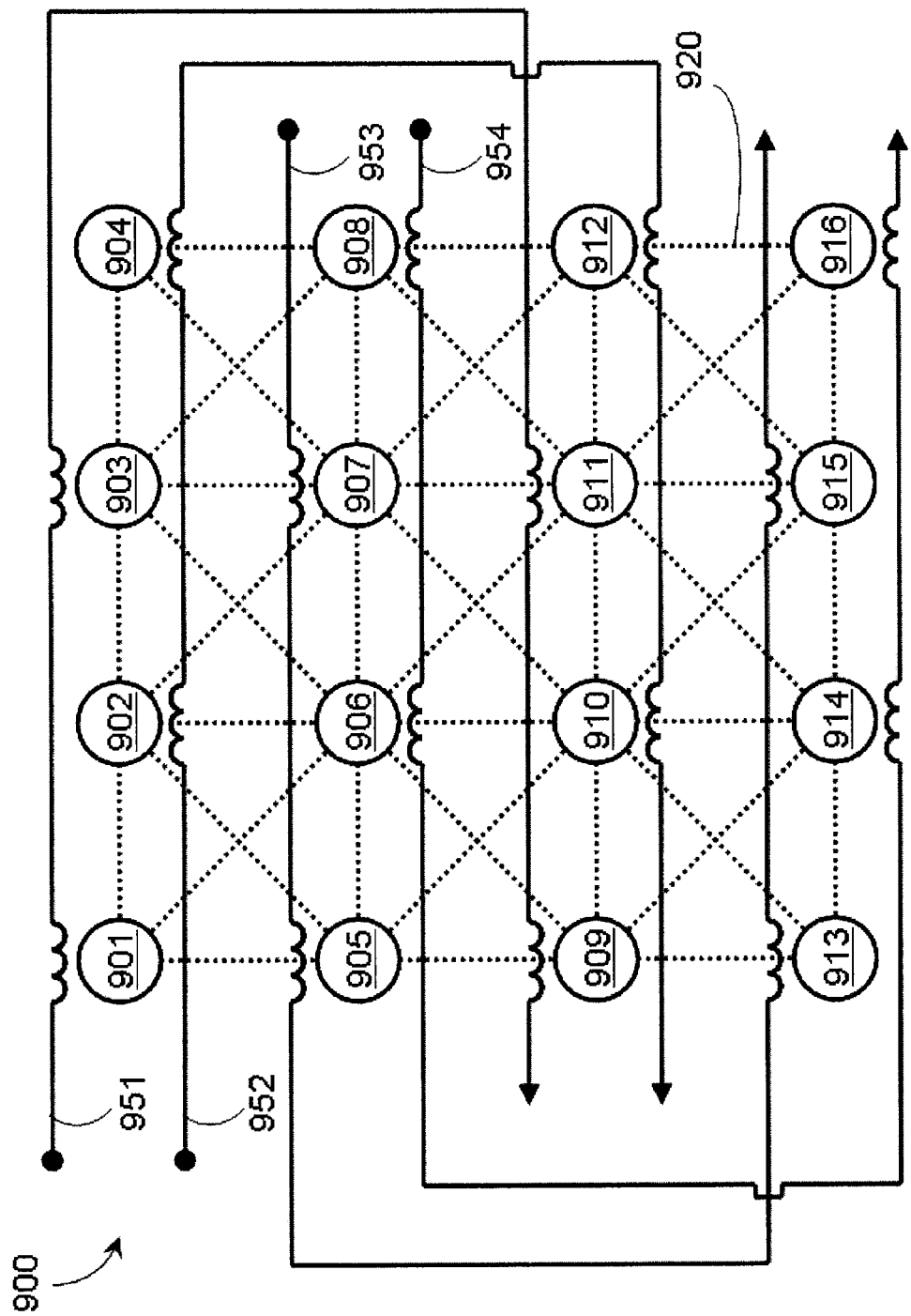
FIG. 9 is an illustrative diagram of an embodiment of an exemplary quantum processor comprising a square lattice of sixteen nearest-neighbor and next-nearest-neighbor coupled qubits, and four interdigitated global signal lines.

FIG. 9 is an illustrative diagram of an exemplary quantum processor 900 comprising a square lattice of sixteen nearest-neighbor and next-nearest-neighbor coupled qubits 901-916. The nearest-neighbor and next-nearest-neighbor coupling architecture of quantum processor 900 implements forty-two coupling devices 920 (only one called out in the Figure, represented by broken lines for clarity), though those of skill in the art will appreciate that any number of qubits and coupling devices may be arranged in a similar pattern. In accordance with the present systems, methods and apparatus, only four global (e.g., annealing) signal lines 951-954 are necessary to enable arbitrary two-qubit manipulations between any pair of coupled qubits in quantum processor 900. That is, by implementing four global signal lines in an interdigitated pattern, the two qubits that form any pair of coupled qubits in quantum processor 900 may each be coupled to a different global signal line. Only four global signal lines may be needed in order to enable arbitrary two-qubit manipulations in a similar nearest-neighbor and next-nearest-neighbor qubit-coupling architecture implementing any number of qubits and coupling devices. Using four interdigitated global signal lines, high precision calibration of device parameters may be achieved in a quantum processor implementing nearest-neighbor and next-nearest-neighbor qubit coupling.

Exemplary quantum processors 800 and 900, from FIGS. 8 and 9, respectively, are intended to illustrate how the techniques described in the present systems, methods and apparatus may be implemented in alternative qubit-coupling architectures. However, the present systems, methods and apparatus are in no way limited to the qubit-coupling architectures illustrated herein. The implementation of a small number of interdigitated global signal lines may be adapted for use with any qubit-coupling architecture and for any dynamic signal. Such implementation has the benefit of enabling arbitrary two-qubit manipulations between pairs of coupled qubits which may be used, for example, to achieve high precision device calibration.

In accordance with the present systems, methods and apparatus, the concept of replacing a single global signal line with a small number of interdigitated global signal lines may be applied to any signal line and is not limited to applications involving annealing signal lines. For example, in the controlled quantum annealing protocol described herein, a dynamic flux bias is coupled from a global signal line to the qubit loop of each qubit (as opposed to the CJJ of each qubit as is the case for an annealing signal line) in order to compensate for fluctuations in persistent currents as the system anneals.

In some embodiments, the at least two global signal lines with which a single global signal line is replaced may both be configured to carry substantially the same signal. In such embodiments, at least a portion of the respective lengths of the at least two global signal lines may be twisted about a common longitudinal axis to mitigate noise and/or crosstalk that may be coupled to the at least two global signal lines from their shared environment.

As previously discussed, the implementation of multiple interdigitated signal lines may facilitate high precision device calibration. A method of achieving such calibration is now described.

Figure 10:
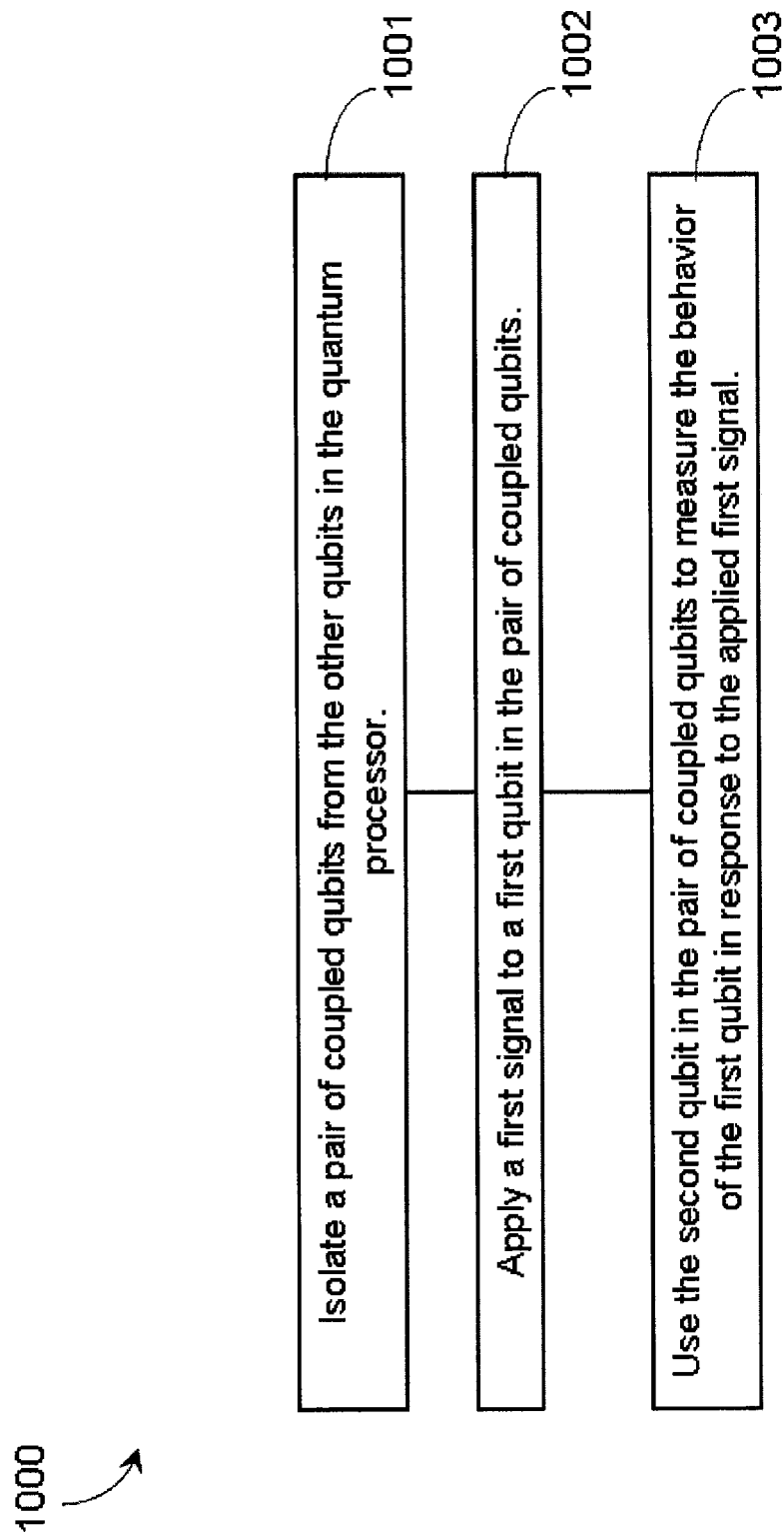
FIG. 10 is a flow diagram of an embodiment of a method for calibrating a first qubit in a quantum processor.

FIG. 10 is a flow diagram of a method 1000 for calibrating a first qubit in a quantum processor. Method 1000 comprises three acts 1001-1003, though those of skill in the art will appreciate that other acts may be included to accommodate alternative implementations. In 1001, a pair of coupled qubits is communicatively isolated from the other qubits in the quantum processor. In 1002, a first signal is applied to a first qubit in the pair of coupled qubits. In 1003, the second qubit in the pair of coupled qubits is used to measure how the first qubit behaves in response to the applied first signal. In some embodiments, method 1000 may then be repeated with the respective roles of the first and second qubits reversed.

In 1001, communicatively isolating a pair of coupled qubits from the other qubits in a quantum processor may be achieved by, for example, deactivating any couplings between the pair of coupled qubits and the other qubits in the quantum processor. Thus, the influence of the other qubits in the quantum processor on the pair of coupled qubits may be reduced. In 1002, a first qubit in the pair of coupled qubits may be used as a source qubit. A first signal of known form may be applied to the first qubit using a first global signal line that is coupled to the first qubit but not substantially (directly) coupled to the second qubit in the pair of coupled qubits. In 1003, the second qubit in the pair of coupled qubits may be used as a sensor qubit to measure the behavior of the first qubit in response to the first applied signal. A second signal of known form may be applied to the second qubit using a second global signal line that is coupled to the second qubit but not substantially (directly) coupled to the first qubit. This second signal may be used to control the sensitivity of the second qubit. In this way, the second qubit may be used to monitor how the first qubit responds to the first signal of known form. The sensor qubit may be used to measure the source qubit for a number of known applied first signals to map out a response curve of the source qubit. Once the parameters of the first qubit have thus been mapped, the first qubit has effectively been calibrated. In some embodiments, method 1000 may then be repeated with the respective roles of the first and second qubits reversed. That is, the second qubit may then be used as the source qubit and the first qubit may then be used as the sensor qubit. Furthermore, because the sensor qubit interacts with the source qubit through a coupling device, some embodiments of method 1000 may be adapted to focus on calibration of the coupling device itself. In such embodiments, the sensor qubit may be used to measure the effect of applying various control signals to the coupling device for a specific configuration of the source qubit.

In some embodiments, all of the qubits that comprise a quantum processor may be calibrated in pairs by implementing method 1000. In some embodiments, this process may be automated and controlled by a calibration algorithm run on a digital computer.

In the various embodiments described herein, a pair of coupled qubits is described as being "communicatively isolated" from the other qubits in a quantum processor by deactivating any couplings between the pair of qubits and the other qubits in the quantum processor. For example, qubits 702 and 703 in FIG. 7 may be treated as a communicatively isolated pair of qubits by activating coupler 712 and deactivating couplers 711 and 713. However, in some embodiments of quantum processors, some or all of the coupling devices may be controlled by the same global coupler control line. In such embodiments, it may not be possible to independently or separately control a particular coupler while deactivating other particular couplers. Thus, the techniques described herein for arranging a small number of global signal lines in such a way that any two coupled qubits are each respectively controlled by a different global signal line may similarly be applied to the global coupler control lines that control the coupling devices. That is, in some embodiments it can be advantageous to ensure that the coupler control line that controls the coupling device that couples between the two qubits that make up any particular pair of qubits in a quantum processor does not control any other coupling device that couples to either one of the two qubits in that particular pair of qubits. This is akin to an arrangement in which each coupling device that couples a particular qubit to another qubit is controlled by a respective global signal line. Such an arrangement can facilitate the communicative isolation of pairs of coupled qubits. For example, in FIG. 7 coupling device 712 couples between the pair of qubits comprising qubits 702 and 703. If the coupler control line that controls coupler 712 also controls coupler 711 and/or coupler 713, then it is not practical to communicatively isolate the pair of qubits that comprises qubits 702 and 703 while simultaneously activating coupler 712. Thus, it can be advantageous to implement a small number (i.e., two in this example) of global signal lines such that control of coupler 712 is independent or separate from control of couplers 711 and 713. The same principle may be applied to any architecture of inter-qubit couplings in a quantum processor, including the arrangement of nearest-neighbor couplings shown in FIG. 8 and the arrangement of nearest neighbor plus next-nearest-neighbor couplings shown in FIG. 9. In general, any particular qubit in a quantum processor may be coupled to a set of other qubits (where a set of other qubits comprises at least one other qubit) with each coupling being achieved through a respective coupling device. In accordance with the present systems, methods and apparatus, the communicative isolation of specific pairs of coupled qubits in such a quantum processor may be facilitated by implementing a small number of global signal lines such that each respective coupling device that couples the particular qubit to another qubit in the set of qubits is independently or separately controlled by a respective one of the global signal lines.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, methods and apparatus of quantum computation, not necessarily the exemplary systems, methods and apparatus for quantum computation generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application Ser. No. 61/054,740, filed May 20, 2008 and entitled "Systems, Methods and Apparatus for Controlled Quantum Annealing Towards a Target Hamiltonian"; U.S. Provisional Patent Application Ser. No. 61/092,665, filed Aug. 28, 2008 and entitled "Systems, Methods and Apparatus to Avoid Local Minima in Quantum Computation"; U.S. Provisional Patent Application Ser. No. 61/094,002, filed Sep. 3, 2008 and entitled "Systems, Methods and Apparatus for Active Compensation of Quantum Processor Elements"; U.S. Provisional Patent Application Ser. No. 61/100,582, filed Sep. 26, 2008 and entitled "Systems, Methods and Apparatus for Calibrating the Elements of a Quantum Processor"; US Patent Publication No. 2006-0225165; US Patent Publication 2008-0176750; U.S. patent application Ser. No. 12/266,378; PCT Patent Application Serial No. PCT/US09/37984; U.S. Pat. No. 7,135,701; US Patent Publication 2008-0215850; US Patent Publication 2006-0248618; US Patent Publication 2009-0078931; US Patent Publication 2009-0082209; U.S. Provisional Patent Application Ser. No. 61/058,494, filed Jun. 3, 2008, entitled "Systems, Methods and Apparatus for Superconducting Demultiplexer Circuits"; U.S. patent application Ser. No. 12/109,847; US Patent Publication 2008-0238531; US Patent Publication 2006-0147154; and US Patent Publication 2008-0274898, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of quantum annealing using a superconducting quantum processor comprising superconducting flux qubits, the method comprising:
   applying a flux bias to each qubit, thereby at least partially defining a problem Hamiltonian;
   applying a disorder term to each qubit, thereby at least partially defining an evolution Hamiltonian;
   gradually removing the disorder term applied to each qubit, thereby inducing a change in a persistent current in each qubit;
   compensating for the change in the persistent current in each qubit by dynamically varying the flux bias applied to each qubit; and
   measuring a state of at least one qubit in the quantum processor.

2. The method of claim 1 wherein gradually removing the disorder term applied to each qubit includes gradually removing the disorder term according to a time-varying annealing waveform.

3. The method of claim 2 wherein compensating for the change in the persistent current in each qubit includes adjusting the flux bias applied to each qubit according to a time-varying compensation waveform.

4. The method of claim 3 wherein the annealing waveform and the compensation waveform are substantially synchronized.

5. The method of claim 1 wherein compensating for the change in the persistent current in each qubit includes maintaining a substantially constant ratio in the evolution Hamiltonian.

6. The method of claim 1 wherein applying a flux bias to each qubit at least partially defines a problem Hamiltonian that includes a 2-local Ising Hamiltonian substantially described by:

$$H_P = \sum_{i=1}^{n} h_i \sigma_i^z + \sum_{i,j=1}^{n} J_{ij} \sigma_i^z \sigma_j^z.$$

7. The method of claim 6 wherein compensating for the change in the persistent current in each qubit includes maintaining a substantially constant ratio of $h_i$: $J_{ij}$ in the problem Hamiltonian.

8. A method of quantum annealing using a quantum processor comprising a set of qubits, the method comprising:
 establishing a problem Hamiltonian by applying at least one control signal to each qubit;
 establishing an evolution Hamiltonian by applying at least one disordering signal to each qubit;
 annealing towards a target Hamiltonian by gradually removing the disordering signals from each qubit; and
 maintaining a substantially fixed dimensionless target Hamiltonian by adjusting the at least one control signal applied to each qubit during the annealing.

9. The method of claim 8 wherein annealing towards a target Hamiltonian includes annealing towards the target Hamiltonian that is substantially similar to the problem Hamiltonian.

10. The method of claim 8, further comprising:
 extracting a scalar prefactor from the problem Hamiltonian.

11. The method of claim 10 wherein maintaining a substantially fixed dimensionless target Hamiltonian includes adjusting the at least one control signal applied to each qubit such that a ratio between the at least one control signal applied to each qubit and the scalar prefactor is substantially constant during the annealing.

12. The method of claim 8 wherein applying a control signal to each qubit includes applying the control signal to each of a number of qubits in a superconducting quantum processor.

13. A qubit control system comprising:
 a first qubit;
 a second qubit;
 a first multiplier, wherein the first multiplier communicably couples to the first qubit;
 a second multiplier, wherein the second multiplier communicably couples to the second qubit; and
 a global signal line, wherein the global signal line communicably couples to both the first multiplier and the second multiplier such that the first multiplier mediates a coupling between the global signal line and the first qubit and the second multiplier mediates a coupling between the global signal line and the second qubit.

14. The qubit control system of claim 13 wherein the first multiplier is tunable to provide a first scaling factor to a dynamic signal carried by the global signal line, and wherein the second multiplier is tunable to provide a second scaling factor to the dynamic signal carried by the global signal line.

15. The qubit control system of claim 14, further comprising:
 a first programming interface that communicably couples to the first multiplier, wherein a controllable signal from the first programming interface operates to tune the first scaling factor of the first multiplier; and
 a second programming interface that communicably couples to the second multiplier, wherein a controllable signal from the second programming interface operates to tune the second scaling factor of the second multiplier.

16. The qubit control system of claim 15 wherein the first programming interface includes a first digital-to-analog converter and the second programming interface includes a second digital-to-analog converter.

17. The qubit control system of claim 15 wherein the first qubit is a superconducting flux qubit comprising a qubit loop and a compound Josephson junction, and wherein the second qubit is a superconducting flux qubit comprising a qubit loop and a compound Josephson junction.

18. The qubit control system of claim 17 wherein the first multiplier is a superconducting coupler comprising a loop of superconducting material interrupted by a compound Josephson junction and the first programming interface communicably couples to the compound Josephson junction of the first multiplier, and wherein the second multiplier is a superconducting coupler comprising a loop of superconducting material interrupted by a compound Josephson junction and the second programming interface communicably couples to the compound Josephson junction of the second multiplier.

19. The qubit control system of claim 18 wherein the first multiplier communicably couples to the qubit loop of the first qubit and the second multiplier communicably couples to the qubit loop of the second qubit.

20. The qubit control system of claim 18 wherein the first multiplier communicably couples to the compound Josephson junction of the first qubit and the second multiplier communicably couples to the compound Josephson junction of the second qubit.

21. The qubit control system of claim 18 wherein the first programming interface includes a first superconducting digital-to-analog converter and the second programming interface includes a second superconducting digital-to-analog converter.

22. A method of applying a dynamic signal to at least two devices in a quantum processor, the method comprising:
 programming a first multiplier to apply a first scaling factor to the dynamic signal in order to accommodate the behavior of a first device in the quantum processor;
 programming a second multiplier to apply a second scaling factor to the dynamic signal in order to accommodate the behavior of a second device in the quantum processor;
 transmitting the dynamic signal through a global signal line;
 communicably coupling the global signal line to the first device in the quantum processor via the first multiplier such that the first multiplier couples a first signal to the first device in the quantum processor, wherein the first signal is the dynamic signal scaled by the first scaling factor; and
 simultaneously communicably coupling the global signal line to the second device in the quantum processor via the second multiplier such that the second multiplier couples a second signal to the second device in the quantum processor, wherein the second signal is the dynamic signal scaled by the second scaling factor.

23. The method of claim 22 wherein the first device is a first superconducting flux qubit and the second device is a second superconducting flux qubit.

24. A quantum processor comprising:
a plurality of qubits arranged in an inter-coupled network such that each qubit communicably couples to at least one other qubit in the inter-coupled network; and
at least two global signal lines, wherein each qubit communicably couples to one of the global signal lines and wherein the at least two global signal lines are arranged in an interdigitated pattern such that any two qubits that communicably couple together each communicably couple to a different one of the global signal lines.

25. The quantum processor of claim 24 wherein the at least two global signal lines are both annealing signal lines that carry annealing signals to evolve the quantum processor during one of an adiabatic quantum computation and a quantum annealing computation.

26. The quantum processor of claim 25 wherein each qubit in the plurality of qubits is a superconducting flux qubit comprising a compound Josephson junction, and wherein the compound Josephson junction of each qubit communicably couples to one of the annealing signal lines.

27. The quantum processor of claim 24 wherein each qubit in the plurality of qubits is a superconducting qubit comprising a qubit loop, wherein each qubit loop is formed by a respective loop of superconducting material, and wherein the qubit loop of each qubit communicably couples to one of the global signal lines.

28. The quantum processor of claim 24 wherein the communicable coupling between any two qubits that are communicably coupled together is achieved through a respective coupling device, and further comprising at least two additional global signal lines such that any two coupling devices that communicably couple to the same qubit are each separately controlled by a respective one of the at least two additional global signal lines.

29. A quantum processor comprising:
a plurality of qubits;
a plurality of couplers arranged to selectively communicably couple respective pairs of the qubits in an inter-coupled network such that each qubit communicably couples to at least one other qubit in the inter-coupled network; and
at least two global signal lines including interfaces selectively operable to couple signals to respective ones of pairs of the qubits wherein any two qubits that are communicably coupled together by a respective coupler are each configured to communicably couple to a different one of the global signal lines.

30. The quantum processor of claim 29 wherein the interfaces are inductive coupling structures.

31. The quantum processor of claim 29, further comprising:
a set of global coupler control lines, wherein any two couplers that communicably couple to the same qubit each communicably couple to a different one of the global coupler control lines.

32. A method of calibrating a qubit in a quantum processor comprising a plurality of qubits arranged in an inter-coupled network, the method comprising:
communicatively isolating a pair of coupled qubits from the other qubits in the quantum processor by deactivating any couplings between the pair of qubits and the other qubits in the quantum processor, wherein the pair of qubits comprises a first qubit and a second qubit;
applying a first signal to the first qubit in the pair of coupled qubits; and
measuring with the second qubit in the pair of coupled qubits a behavior of the first qubit in response to the first signal.

33. The method of claim 32 wherein the first qubit is operated as a source qubit and the second qubit is operated as a sensor qubit.

34. The method of claim 32, further comprising:
applying a second signal to the second qubit in the pair of coupled qubits; and
measuring with the first qubit in the pair of coupled qubits a behavior of the second qubit in response to the second signal.

35. A superconducting quantum processor comprising:
a plurality of qubits;
a plurality of couplers that provide communicable coupling between at least some respective pairs of qubits;
a first set of programming interfaces operable to apply a flux bias to each qubit;
a second set of programming interfaces operable to apply a dynamic annealing signal to each qubit; and
a third set of programming interfaces operable to apply a dynamic compensation signal to each qubit, wherein each programming interface in the third set of programming interfaces includes a respective multiplier, and wherein each respective multiplier mediates a communicable coupling between a global signal line and a respective qubit.

36. A superconducting quantum processor comprising:
a plurality of qubits;
a plurality of couplers that provide communicable coupling between at least some respective pairs of qubits; and
a set of programming interfaces to:
establish a problem Hamiltonian by applying at least one control signal to each qubit;
establish an evolution Hamiltonian by applying at least one disordering signal to each qubit;
anneal towards a target Hamiltonian by gradually removing the disordering signals from each qubit; and
maintain a substantially fixed dimensionless target Hamiltonian by adjusting the at least one control signal applied to each qubit during the annealing.

37. A quantum processor comprising:
a first qubit;
a first programming interface to apply a first signal to the first qubit; and
a second qubit to measure a behavior of the first qubit in response to the first signal.

* * * * *